(12) United States Patent
Beall et al.

(10) Patent No.: US 11,536,176 B2
(45) Date of Patent: Dec. 27, 2022

(54) HIGH ASH STORAGE, PATTERN-PLUGGED, HONEYCOMB BODIES AND PARTICULATE FILTERS

(71) Applicant: CORNING INCORPORATED, Corning, NY (US)

(72) Inventors: Douglas Munroe Beall, Painted Post, NY (US); Achim Karl-Erich Heibel, Corning, NY (US); Pushkar Tandon, Painted Post, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 16/765,600

(22) PCT Filed: Nov. 20, 2018

(86) PCT No.: PCT/US2018/062049
§ 371 (c)(1),
(2) Date: May 20, 2020

(87) PCT Pub. No.: WO2019/104057
PCT Pub. Date: May 31, 2019

(65) Prior Publication Data
US 2020/0300138 A1    Sep. 24, 2020

Related U.S. Application Data

(60) Provisional application No. 62/589,283, filed on Nov. 21, 2017.

(51) Int. Cl.
*F01N 3/022*    (2006.01)
*B01D 46/24*    (2006.01)

(52) U.S. Cl.
CPC ......... *F01N 3/0222* (2013.01); *B01D 46/247* (2013.01); *B01D 46/249* (2021.08);
(Continued)

(58) Field of Classification Search
None
See application file for complete search history.

(56) References Cited

U.S. PATENT DOCUMENTS 3,885,977 A    5/1975    Lachman et al.
4,415,344 A    11/1983    Frost et al.
(Continued)

FOREIGN PATENT DOCUMENTS

CN    106481391 A    3/2017
EP    3115096 A1    1/2017
(Continued)

OTHER PUBLICATIONS

Machine translation of Nagata et al. (WO 2016157420 A1) Translated Apr. 3, 2022 via Espacenet (Year: 2016).*

(Continued)

*Primary Examiner* — Elizabeth Collister
(74) *Attorney, Agent, or Firm* — Joseph M. Homa

(57) ABSTRACT

A honeycomb body having intersecting porous walls and repeating structural units. Each repeating structural unit has a plurality of inlet channels and outlet channels that extend parallel to each other in an axial direction from an inlet face to an outlet face. Each of the repeating structural units has 2.0<I/O<3.0, wherein I/O is a ratio of a number of inlet channels to a number of the outlet channels, each of the inlet and outlet channels have a same cross-sectional size and shape, and each inlet channel of a particular repeating structural unit directly abuts an outlet channel of the particular repeating structural unit or an outlet channel of an adjacent repeating structural unit. Particulate filters including the honeycomb body, honeycomb extrusion dies, and methods of capturing soot in the honeycomb body are provided, as are other aspects.

6 Claims, 11 Drawing Sheets

(52) U.S. Cl.
CPC ..... *B01D 46/2484* (2021.08); *B01D 46/2492* (2021.08); *B01D 46/2486* (2021.08); *F01N 2330/06* (2013.01); *F01N 2330/34* (2013.01); *F01N 2330/48* (2013.01)

(56) References Cited

U.S. PATENT DOCUMENTS

| | | |
|---|---|---|
| 4,417,908 A | 11/1983 | Pitcher, Jr. |
| 4,420,316 A | 12/1983 | Frost et al. |
| 4,557,773 A | 12/1985 | Bonzo |
| 5,332,703 A | 7/1994 | Hickman |
| 6,221,308 B1 | 4/2001 | Peng |
| 6,259,078 B1 | 7/2001 | Araya |
| 6,391,813 B1 | 5/2002 | Merkel |
| 6,541,407 B2 | 4/2003 | Beall et al. |
| 6,673,300 B2 | 1/2004 | Allen et al. |
| 6,696,132 B2 | 2/2004 | Beall et al. |
| 7,017,278 B2 | 3/2006 | Kato |
| 7,596,885 B2 | 10/2009 | Adrian et al. |
| 7,744,669 B2 | 6/2010 | Paisley et al. |
| 7,922,951 B2 | 4/2011 | Mudd et al. |
| 8,236,083 B2 | 8/2012 | Garcia et al. |
| 8,435,441 B2 | 5/2013 | Bookbinder et al. |
| 8,974,724 B2 | 3/2015 | Day et al. |
| 9,005,517 B2 | 4/2015 | Bronfenbrenner et al. |
| 9,038,284 B2 | 5/2015 | Feldman et al. |
| 9,132,578 B2 | 9/2015 | Anthony et al. |
| 9,335,093 B2 | 5/2016 | Feldman et al. |
| 9,446,560 B2 | 9/2016 | Bronfenbrenner et al. |
| 9,452,578 B2 | 9/2016 | Bronfenbrenner et al. |
| 2008/0120968 A1* | 5/2008 | Beall ................... F01N 3/035 60/295 |
| 2011/0132194 A1* | 6/2011 | Ahmed ............ B01D 46/2459 95/273 |
| 2014/0084505 A1 | 3/2014 | Vileno et al. |
| 2015/0096274 A1 | 4/2015 | Shibata et al. |
| 2017/0072358 A1 | 3/2017 | Yoshino |
| 2019/0126186 A1 | 5/2019 | Beall et al. |
| 2019/0374896 A1 | 12/2019 | Beall et al. |

FOREIGN PATENT DOCUMENTS

| | | |
|---|---|---|
| FR | 2893668 A1 | 5/2007 |
| JP | 2009-243274 A | 10/2009 |
| JP | 2014-050793 A | 3/2014 |
| WO | 2015/133435 A1 | 9/2015 |
| WO | 2016/158420 A1 | 10/2016 |
| WO | 2017/185091 A2 | 10/2017 |

OTHER PUBLICATIONS

International Search Report and Written Opinion of the International Searching Authority; PCT/US2018/062049; dated Jan. 30, 2019; 12 Pages; European Patent Office.

Chinese Patent Application No. 201880085981.0, Office Action dated Jul. 30, 2021, 4 pages (English Translation Only), Chinese Patent Office.

Japanese Patent Application No. 2020-528149 Office Action dated Aug. 18, 2021, 8 pages (4 pages of English Translation and 4 pages of Original Document); Japanese Patent Office.

* cited by examiner

I/O = 2.25:1

I/O = 2.25:1

I/O = 2.50:1

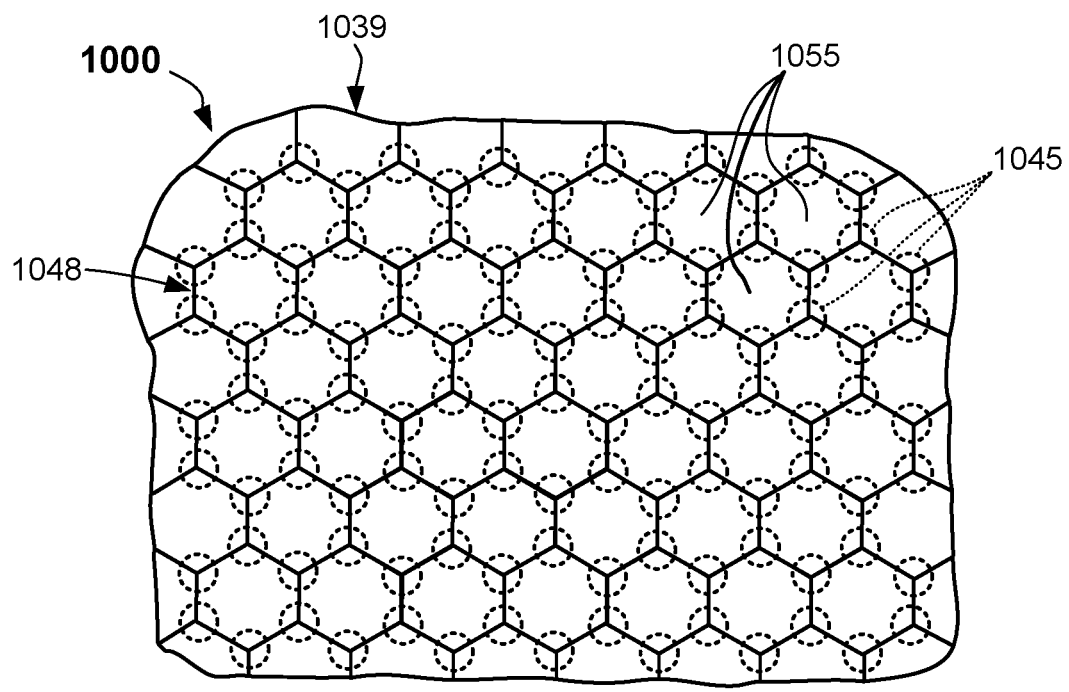

Providing A Particulate Filter Including A Honeycomb Body Having Repeating Structural Units With 2.0 < I/O < 3.0, Wherein I/O Is A Ratio Of A Number Of Inlet Channels To A Number Of Outlet Channels, And Wherein Each Of The Inlet Channels And Outlet Channels In The Repeating Structural Units Have A Same Cross-sectional Area And A Same Cross-sectional Shape, And Wherein Each Inlet Channel Of A Particular Repeating Structural Unit Directly Abuts An Outlet Channel Of The Particular Repeating Structural Unit Or An Outlet Channel Of An Adjacent Repeating Structural Unit — 1102

Capturing Soot And Ash In The Honeycomb Body — 1104

FIG. 11

HIGH ASH STORAGE, PATTERN-PLUGGED, HONEYCOMB BODIES AND PARTICULATE FILTERS

CROSS-REFERENCE TO RELATED APPLICATIONS

This application is a National Stage application under 35 U.S.C. § 371 of International Application No. PCT/US2018/062049 filed on Nov. 20, 2018 which claims the benefit of priority under 35 U.S.C. § 119 of U.S. Provisional Application Ser. No. 62/589,283, filed Nov. 21, 2017, the contents of which are relied upon and incorporated herein by reference in their entireties.

FIELD

Embodiments of the disclosure relate to honeycomb bodies, and more particularly to honeycomb bodies used in particulate filters suitable for filtering particles from a fluid stream, such as engine exhaust.

BACKGROUND

Standard honeycomb particulate filters include a honeycomb body having a plurality of intersecting porous walls forming series of co-parallel, axially-extending channels. In a standard filter configuration, half of these channels are plugged on the inlet side in a checkerboard pattern with these same channels being unplugged on the outlet side, thus forming outlet channels. The other half of the axially-extending channels are plugged in a checkerboard pattern on the outlet side and unplugged on the inlet side, thus forming inlet channels. In use, engine exhaust flows through the porous walls of the honeycomb body and particles (soot, ash, and other inorganic particles) are filtered from the engine exhaust and remain in, and on, the porous wall. Over time, the soot will build up and from time-to-time may be regenerated wherein the soot is burned out. However, with continued use, ash can build up and to an increasing extent start to cause an appreciable pressure drop across the filter. Such pressure drop may possibly reduce the power of the vehicle and thus measures to better control such pressure drop increases are desired.

Honeycomb body designs having relatively high soot and ash carrying capability, improved pressure drop performance, and which are inexpensive to manufacture are sought.

SUMMARY

In one aspect, a honeycomb body is provided. The honeycomb body comprises intersecting porous walls forming a matrix of repeating structural units arranged in a repeating pattern, wherein each of the repeating structural units comprises: a plurality of inlet channels and a plurality of outlet channels that extend parallel to each other in an axial direction from an inlet face to an outlet face, 2.0<I/O<3.0, wherein I/O is a ratio of a number of inlet channels to a number of the outlet channels in each of the repeating structural units, each of the inlet channels and the outlet channels have a same cross-sectional size and cross-sectional shape in a transverse plane orthogonal to the axial direction, and each inlet channel of a particular repeating structural unit directly abuts an outlet channel of the particular repeating structural unit or an outlet channel of an adjacent repeating structural unit.

In some embodiments, each of the inlet channels and outlet channels in each of the repeating structural units is square in cross-section in the transverse plane.

In some embodiments, each of the inlet channels and outlet channels in each of the repeating structural units is hexagonal in cross-section in the transverse plane.

In some embodiments, each of the repeating structural units comprises nine inlet channels and four outlet channels and I/O is 2.25:1.

In some embodiments, each of the repeating structural units comprises thirteen channels.

In some embodiments, each of the repeating structural units comprises a first line of six channels and a second adjacent line of seven channels.

In some embodiments, each of the repeating structural units is offset one channel width from an adjacent one of the repeating structural units.

In some embodiments, each inlet channel of a particular repeating structural unit directly abuts an outlet channel of the particular repeating structural unit.

In some embodiments, the repeating pattern of repeating structural units comprises a group of four diagonally-aligned outlet channels bounded on either end by inlet channels.

In some embodiments, the repeating pattern of repeating structural units comprises a series of co-parallel groups of four diagonally-aligned outlet channels wherein each group is bounded on either end by inlet channels.

In some embodiments, each of the repeating structural units comprises seven inlet channels and three outlet channels and I/O is 2.33:1.

In some embodiments, each of the repeating structural units comprises ten channels arranged in a straight line.

In some embodiments, each of the repeating structural units has an end that is offset two channel widths from a corresponding end of an adjacent one of the repeating structural units.

In some embodiments, the repeating pattern of repeating structural units comprises a group of three diagonally-aligned outlet channels bounded on either end by inlet channels.

In some embodiments, the repeating pattern of repeating structural units comprises a series of co-parallel groups of three diagonally-aligned outlet channels wherein each group is bounded on either end by inlet channels.

In some embodiments, each of the repeating structural units comprises five inlet channels and two outlet channels and I/O is 2.50:1.

In some embodiments, each of the repeating structural units comprises seven channels arranged in a line.

In some embodiments, each of the repeating structural units has an end that is offset two channel widths from a corresponding end of an adjacent one of the repeating structural units.

In some embodiments, the repeating pattern of repeating structural units comprises a group of two diagonally-aligned outlet channels bounded on either end by inlet channels.

In some embodiments, the repeating pattern of repeating structural units comprises a series of co-parallel groups of two diagonally-aligned outlet channels wherein each group is bounded on either end by inlet channels.

In some embodiments, each of the repeating structural units comprises eight inlet channels and three outlet channels and I/O is 2.67:1.

In some embodiments, each of the repeating structural units comprises eleven channels.

In some embodiments, each of the repeating structural units comprises a first line of five channels and a second adjacent line of six channels.

In some embodiments, each of the repeating structural units is offset one channel width from an adjacent one of the repeating structural units.

In some embodiments, each inlet channel of a particular repeating structural unit directly abuts an outlet channel of the particular repeating structural unit.

In some embodiments, the repeating pattern of repeating structural units comprises a group of three diagonally-aligned outlet channels bounded on either end by inlet channels.

In some embodiments, the repeating pattern of repeating structural units comprises a series of co-parallel groups of three diagonally-aligned outlet channels wherein each group is bounded on either end by inlet channels.

In some embodiments, each of the repeating structural units comprises eleven inlet channels and four outlet channels and I/O is 2.75:1.

In some embodiments, each of the repeating structural units comprises fifteen channels.

In some embodiments, each of the repeating structural units comprises a first line of seven channels and a second adjacent line of eight channels.

In some embodiments, each of the repeating structural units is offset one channel width from an adjacent one of the repeating structural units.

In some embodiments, each inlet channel of a particular repeating structural unit directly abuts an outlet channel of the particular repeating structural unit.

In some embodiments, the repeating pattern of repeating structural units comprises a group of two diagonally-aligned outlet channels bounded on either end by inlet channels.

In some embodiments, the repeating pattern of repeating structural units comprises a series of co-parallel groups of two diagonally-aligned outlet channels wherein each group is bounded on either end by inlet channels.

In some embodiments, $2.25 \leq I/O \leq 2.75$.

In some embodiments, $2.33 \leq I/O \leq 2.67$.

In another aspect, a method of filtering particulates comprises providing a particulate filter including a honeycomb body according to any of the embodiments described above and capturing soot and ash in the honeycomb body.

In a further aspect, a honeycomb body is provided. The honeycomb body comprises intersecting porous walls forming a matrix of repeating structural units arranged in a repeating pattern, wherein each of the repeating structural units is offset from, but directly abutting, another of the repeating structural units and comprises: a plurality of inlet channels numbering between five and eleven and a plurality of outlet channels numbering between two and four that extend parallel to each other in an axial direction from an inlet face to an outlet face, $2.0 < I/O < 3.0$, wherein I/O is a ratio of a number of inlet channels to a number of the outlet channels in each of the repeating structural units, each of the inlet channels and the outlet channels have a same cross-sectional size and square or hexagonal cross-sectional shape in a transverse plane orthogonal to the axial direction, and each inlet channel of a particular repeating structural unit directly abuts an outlet channel of the particular repeating structural unit or an outlet channel of an adjacent repeating structural unit.

In yet another aspect, a honeycomb body is provided. The honeycomb body comprises intersecting porous walls forming a matrix of repeating structural units arranged in a repeating pattern, wherein each of the repeating structural units is offset from, but directly abutting, another of the repeating structural units and comprises: a plurality of inlet channels and a plurality of outlet channels that extend parallel to each other in an axial direction from an inlet face to an outlet face, $2.0 < I/O < 3.0$, wherein I/O is a ratio of a number of inlet channels to a number of the outlet channels in each of the repeating structural units, each of the inlet channels and the outlet channels have a same cross-sectional size and square or hexagonal cross-sectional shape in a transverse plane orthogonal to the axial direction, and each inlet channel of a particular repeating structural unit directly abuts an outlet channel of the particular repeating structural unit.

Numerous other features and aspects are provided in accordance with these and other embodiments of the disclosure. Further features and aspects of embodiments will become more fully apparent from the following detailed description, the appended claims, and the accompanying drawings.

BRIEF DESCRIPTION OF THE DRAWINGS

The accompanying drawings, described below, are for illustrative purposes and are not necessarily drawn to scale. The drawings are not intended to limit the scope of the disclosure in any way. Like numerals are used throughout the specification and drawings to denote like elements.

FIG. 10 illustrates a partial front view of an extrusion die illustrating a hexagonal pin structure and feedhole locations according to one or more embodiments.

FIG. 11 illustrates a flowchart depicting a method of operating a particulate filter including an inventive honeycomb body according to one or more embodiments.

DETAILED DESCRIPTION

Figure 1A:
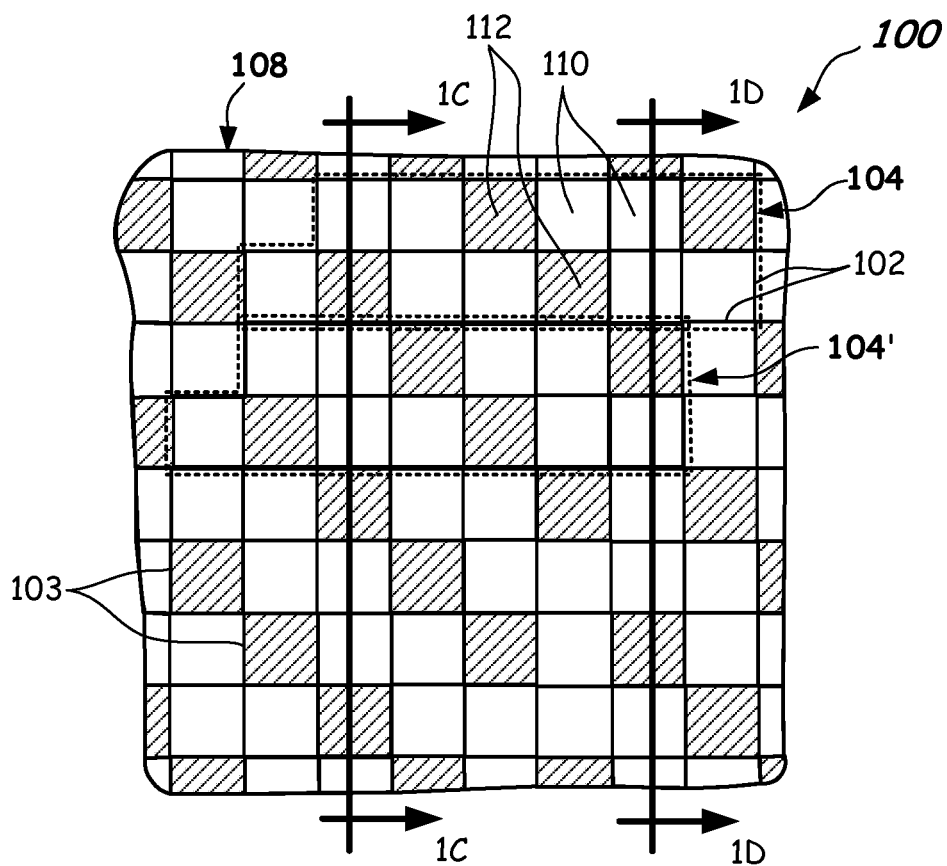
FIG. 1A illustrates a partial end view of an inlet face of a honeycomb body including a first plugging pattern according to one or more embodiments.

Reference will now be made in detail to the example embodiments of this disclosure, which are illustrated in the accompanying drawings. In describing the embodiments, numerous specific details are set forth in order to provide a thorough understanding of the disclosure. However, it will be apparent to a person of ordinary skill in the art that the invention may be practiced without some or all of these specific details. In other instances, well-known structural or functional features and/or process steps have not been described in detail so as not to unnecessarily obscure the invention. Structural and functional features of the various embodiments described herein may be combined with each other, unless specifically noted otherwise.

In view of the problems of the prior art, various embodiments of this disclosure relate to a honeycomb body configured for use in a Gasoline Particulate Filter (GPF) and/or a Diesel Particulate Filter (DPF), which not only allows for excellent storage capacity of soot and/or ash (or other inorganic particles) in the honeycomb body relative to currently-available particulate filter designs, but does so while maintaining relatively-low clean pressure drop and relatively-low pressure drop increase across the particulate filter as a function of soot and/or ash loading.

The ability of a particulate filter to store large amounts of ash has become a diligently-sought goal in the particulate filter industry. The filter (GPF or DPF) not only collects soot particles and ash, but also traps inorganic materials that are either present in the soot or that flake off from the manifold or other engine or exhaust components. These inorganic materials cannot be burned out with the soot via regeneration, and therefore will, over time, build up along with the ash in the particulate filter. Such buildup of inorganic particles and ash may eventually result in a pressure drop increase across the honeycomb body that may be unacceptably high.

To alleviate this pressure increase, maintenance of the particulate filter may be undertaken in the prior art via removal and replacement with a new filter, or optionally replacement with a cleaned filter that has had such ash and inorganic material removed therefrom. However, this maintenance process can be very expensive. Moreover, the vehicle may be undesirably taken out of service for such maintenance. Therefore, there is a strong need in the industry for a particulate filter with an increased storage capacity as compared to existing designs, so as to eliminate or reduce the frequency of such maintenance intervals, and which also exhibits relatively-low clean pressure drop as well as relatively-low pressure drop increase upon soot and ash loading.

As discussed above, this concern has been previously addressed by increasing the relative size of the inlet channels and decreasing the relative size of the outlet channels relative to a standard checkerboard design. For example, using an Asymmetric Cell Technology (ACT) design of the honeycomb body as is disclosed in U.S. Pat. No. 6,696,132 to Beall, et al. has resulted in a relatively-higher soot carrying capacity. However, in order to achieve sufficiently-high levels of ash storage so that low maintenance over a suitable lifetime is obtained, the ratio of inlet channel size to outlet channel size becomes very large. When this ratio increases beyond a certain extent, the outlet channels become exceedingly small. The very small outlet channels may result in a concomitantly large pressure drop across the clean filter, but also a large pressure drop as a function of ash and/or soot loading. Moreover, extrusion dies used to form such ACT honeycomb structures may be relatively expensive due to the tedious nature of plunge electrical discharge machining (EDM) electrode technology used for manufacturing such extrusion dies.

Alternatively, designs having an increased density of inlet channels relative to density of outlet channels have been disclosed, such as in U.S. Pat. No. 4,420,316 to Frost et al., U.S. Pat. No. 4,417,908 to Pitcher, Jr., and U.S. Pat. No. 8,236,083 to Garcia et al. These designs (herein referred to as "high inlet number" designs) are achieved by plugging a larger number of channels on the outlet side than the inlet side. Designs having I/O ratios of 2:1 and 3:1 are disclosed.

The inventors herein have discovered that certain high inlet number designs, where the ratio of number of inlet channels to outlet channels is greater than 2:1, can result in a large ash storage capacity. However, when the ratio of inlet channels to outlet channels is greater than or equal to 3:1, the pressure drop penalty may be higher than desired due to the small number of outlet channels having to carry all of the outlet exhaust flow.

Another way to increase ash storage volume is simply to increase the size of the honeycomb body in the particulate filter. However, in most cases, this approach is not viable due to space limitations of the vehicle.

In accordance with one or more embodiments of the disclosure, a honeycomb body is provided with increased storage capacity for ash (and/or inorganics) to provide for longer time periods between service intervals, but which also limits the pressure drop increase penalty as a function of soot loading and/or ash loading.

Such honeycomb bodies may result in the maintenance of good vehicle fuel economy and/or not appreciably detracting from engine power between service intervals. In another possible advantage, clean pressure drop may be dramatically improved as compared to comparative standard, ACT, and existing high-inlet-number designs. Moreover, one or more embodiments of the disclosure may provide manufacturing benefits enabling the use of extrusion die manufacturing technologies that are relatively inexpensive, such as abrasive wheel slotting or wire EDM. For example, in one or more embodiments, straight line die cuts from side-to-side entirely across the extrusion die outlet face (e.g., in two orthogonal directions) may be used. These processes may dramatically lower extrusion die manufacturing cost.

Thus, in one or more embodiments, a honeycomb body, configured for use in a particulate filter (DPF or GPF), having an advantageous inlet channel configuration, outlet channel configuration, and plugging pattern provides combinations of relatively-high ash storage capability, relatively-low clean pressure drop, and relatively-low pressure drop increase as a function of soot loading and/or ash loading.

One or more embodiments of the honeycomb body include intersecting porous walls forming a matrix of repeating structural units that are arranged in a repeating pattern. Each of the repeating structural units comprises a plurality of inlet channels and a plurality of outlet channels that extend parallel to each other in an axial direction from an inlet face to an outlet face of the honeycomb body. Inlet cells are plugged at or near the outlet face, whereas, outlet cells are plugged at or near the inlet face. An I/O ratio is defined herein as a ratio of a number of inlet channels to a number of the outlet channels in each of the repeating structural units. The I/O ratio may be designated as simply "I/O". In accordance with embodiments, the I/O ratio is between 2.0 and 3.0 (i.e., 2.0<I/O<3.0). Further, each of the inlet channels and the outlet channels have a same cross-sectional size and cross-sectional shape in a transverse plane orthogonal to the axial direction. Moreover, each inlet channel of a particular repeating structural unit directly abuts either an outlet channel of the particular repeating structural unit or an outlet channel of an adjacent repeating structural unit. By "directly abuts" it is meant that each inlet channel shares a filtering wall in side-by-side relation with one or more outlet channels.

Other structural attributes of embodiments of honeycomb bodies including several configurations of the repeating structural unit are described fully herein.

As used herein "honeycomb body" means a wall-flow honeycomb body configured to be accepted into and used in a can or housing, wherein the honeycomb body comprises open and interconnected porosity, a matrix of intersecting porous walls forming the above-mentioned repeating structural units, wherein each repeating structural unit includes at least some inlet channels and at least some outlet channels and a ratio of inlet channels to outlet channels (I/O) of 2.0<I/O<3.0. Such honeycomb bodies further include at least one filtration wall associated with each inlet channel. A "filtration wall" as used herein is defined as a wall that is shared between an inlet channel and an outlet channel.

In other embodiments of the disclosure, particulate filters including the honeycomb bodies, exhaust systems including particulate filters, as well as methods of filtering particulates are provided, as are other aspects and features.

Further details of exemplary honeycomb bodies, particulate filters, exhaust systems including particulate filters, and methods of filtering particulates such as soot and ash are described with reference to FIGS. 1A-11 herein.

Figure 1B:
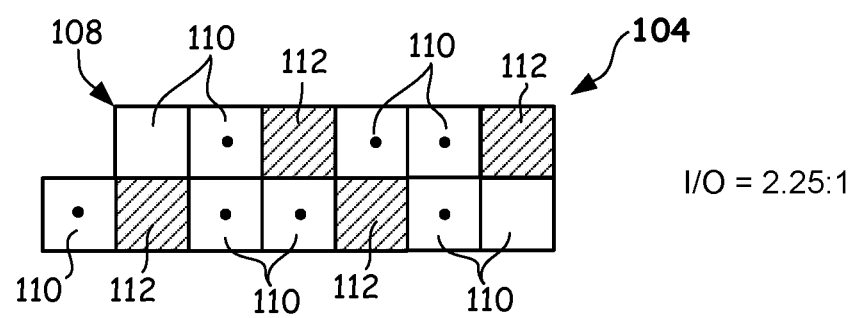
FIG. 1B illustrates an inlet-side view of a repeating structural unit of the honeycomb body of FIG. 1A including an I/O ratio of 2.25:1 according to one or more embodiments.
Figure 1C:
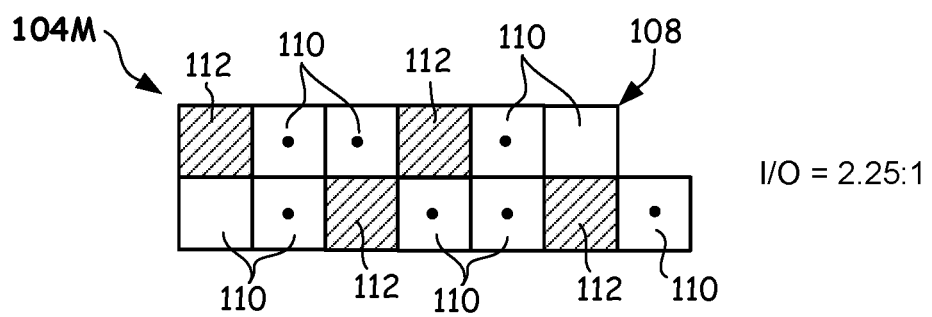
FIG. 1C illustrates an inlet-side view of a repeating structural unit of a mirror image of the repeating structural unit of FIG. 1B according to one or more embodiments.
Figure 1D:
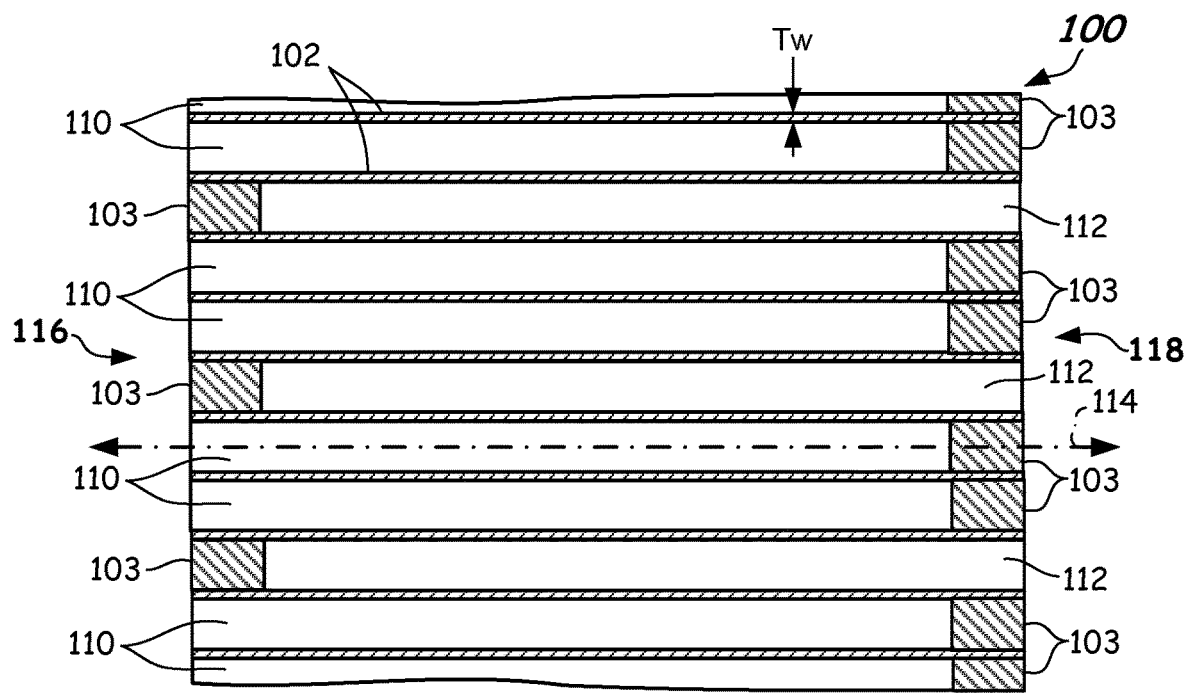
FIG. 1D illustrates a cross-sectioned, partial side view of a honeycomb body taken along section line 1C-1C of FIG. 1A according to one or more embodiments.
Figure 1E:
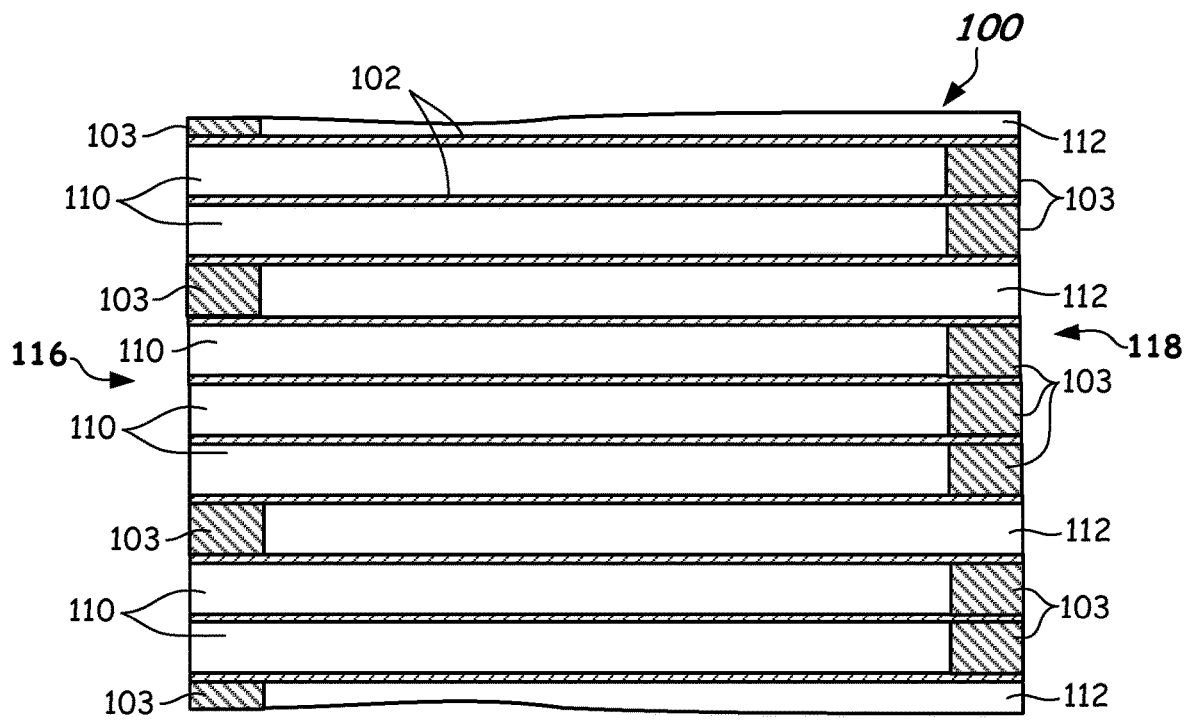
FIG. 1E illustrates a cross-sectioned, partial side view of a honeycomb body taken along section line 1D-1D of FIG. 1A according to one or more embodiments.

FIGS. 1A-1B illustrates partial inlet face views, respectively, of a first example embodiment of a honeycomb body 100 and repeating structural unit 104 thereof according to the present disclosure. The honeycomb body 100 has utility for use as a filtering media in a particulate filter, which is used for filtering particulates (e.g., soot and/or inorganics) from a flow stream, such as from an engine exhaust stream of an internal combustion engine (e.g., gas or diesel engine). This embodiment of honeycomb body 100 includes a plurality of intersecting porous walls 102 and plugs 103 forming a matrix of repeating structural units 104 arranged in a repeating pattern. The plugs 103 are shown in FIGS. 1D and 1E. The porous walls 102 in this embodiment, intersect with one another (e.g., at right angles) and form a plurality of longitudinally-extending cell channels 108 that are parallel with one another. Some of the longitudinally-extending cell channels 108 comprise inlet channels 110 whereas other ones comprise outlet channels 112. The porous walls 102 may include open, interconnected porosity and the porous walls 102 may be made of a ceramic or other suitable porous material that can withstand high temperatures in use, such as those encountered during thermal regeneration of the honeycomb body 100. For example, the intersecting porous walls 102 may be made of a ceramic material, such as cordierite, silicon carbide (SiC), aluminum titanate, mullite, alumina ($Al_2O_3$), silicon aluminum oxynitride ($Al_6O_2N_6Si$), zeolite, enstatite, forsterite, corrundum, spinel, sapphirine, periclase, combinations of the afore-mentioned, and the like. Other suitable porous materials may be used, such as fused silica or porous metal, or combinations thereof. The same or similar materials may be used for the other embodiments described herein.

In the case of ceramics, the porous walls 102 may be formed during an extrusion process wherein a suitable plasticized batch mixture of inorganic and organic batch components and a liquid vehicle (e.g., deionized water) are extruded through a honeycomb extrusion die and then dried and fired to produce a ceramic honeycomb body without plugs. The ceramic honeycomb body may then be plugged with plugs 103 in a defined plugging pattern described herein to produce the honeycomb bodies 100 including the matrix of repeating structural units 104. Inlet channels 110 are plugged with plugs 103 in a pattern at or near the outlet face 118, whereas outlet channels 112 are plugged in a pattern with plugs 103 at or near the inlet face 116. Inlet face 116 and outlet face 118 are generally opposed to one another as shown in FIGS. 1C and 1D. Suitable non-limiting plugging materials and processes are described in U.S. Pat. Nos. 4,557,773, 6,673,300, 7,744,669, and 7,922,951, for example. Other suitable plugging methods may be used. In other embodiments, the dried green honeycomb body may be plugged and then fired, or partially fired, plugged, and fired again.

Suitable powdered inorganic material(s) may be mixed with an organic binder and liquid vehicle, for example, to produce the plugging material. The plugs 103 may or may not be flush with the inlet face 116 and outlet face 118. Plugs 103 may fill the channel width and height and may have a plug depth along the axial axis 114 of between about 0.004 inch (0.10 mm) and about 0.100 inch (2.54 mm), or even between about 0.004 inch (0.10 mm) and about 0.06 inch (1.52 mm), for example. Other plug depths may be used. The plugs 103 may also include open interconnected porosity.

The honeycomb body 100 may include a skin 105 (FIG. 1E-1F) on an outer radial periphery defining an outer peripheral surface 100S of the honeycomb body 100. The skin 105 may be extruded during the extrusion manufacture or may be an after-applied skin in some embodiments, i.e., applied as ceramic-based skin cement onto an outer periphery (e.g., machined periphery) of a ceramic or dried green body honeycomb body. The skin 105 may include a skin thickness Ts (FIG. 1E) that is substantially uniform about the radial periphery of the honeycomb body 100 when extruded, for example. The skin thickness Ts may be between about 0.1 mm to 100 mm, or even between 1 mm to 10 mm, for example. Other skin thicknesses Ts may be used. The transverse cross-sectional area of each cell channel 108 may be constant along its length. Moreover, a transverse wall thickness of the porous walls 102 may be constant along a length of the porous walls 102. For example, the transverse wall thickness may be between about 100 µm and 400 µm.

Apparatus and methods for skinning articles, such as honeycomb bodies are described in U.S. Pat. No. 9,132,578, for example. Other suitable skinning methods may be used. In embodiments described herein, the intersecting porous walls 102 may advantageously extend continuously across the honeycomb body 100 between sections of the skin 105 in both orthogonal directions (vertically and horizontally as shown). As will be apparent, this configuration has definite benefits in terms of reducing extrusion die cost as wire EDM, abrasive slotting wheel, or other low-cost manufacturing methods may be used.

Figure 1F:
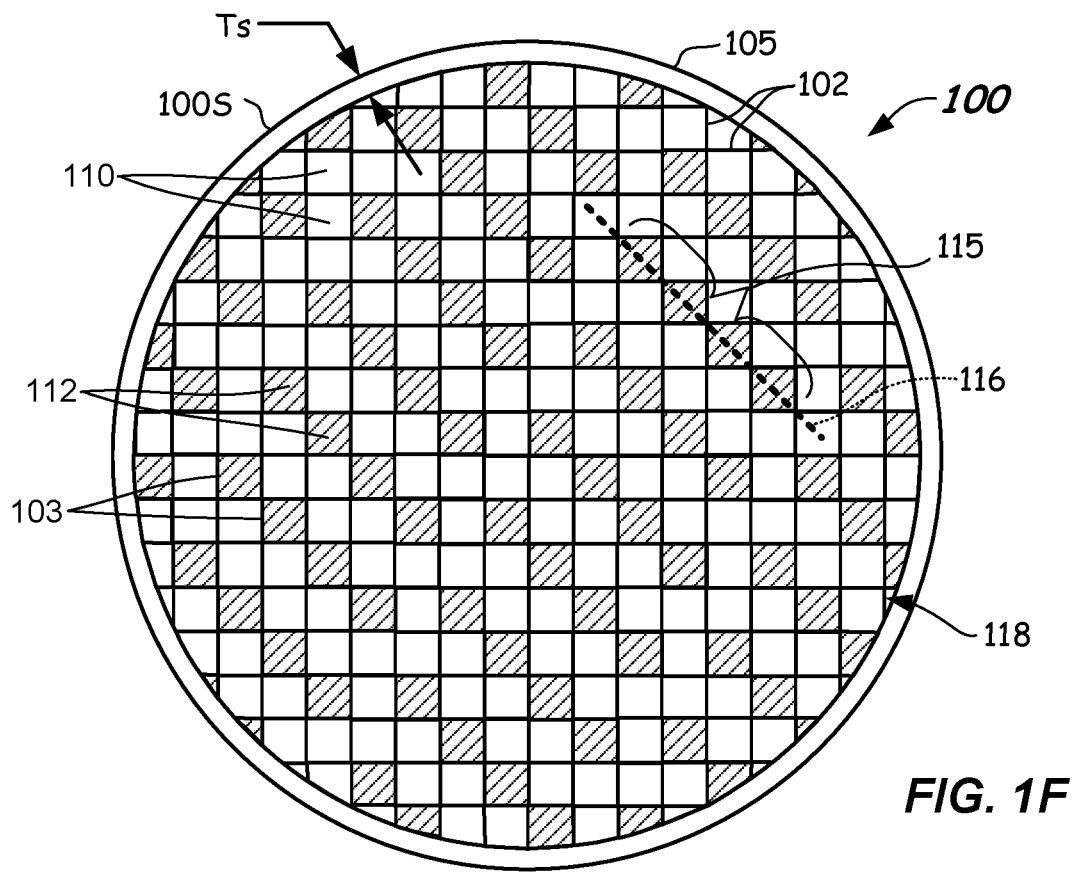
FIG. 1F illustrates an inlet-side, end view of a honeycomb body according to one or more embodiments.
Figure 1G:
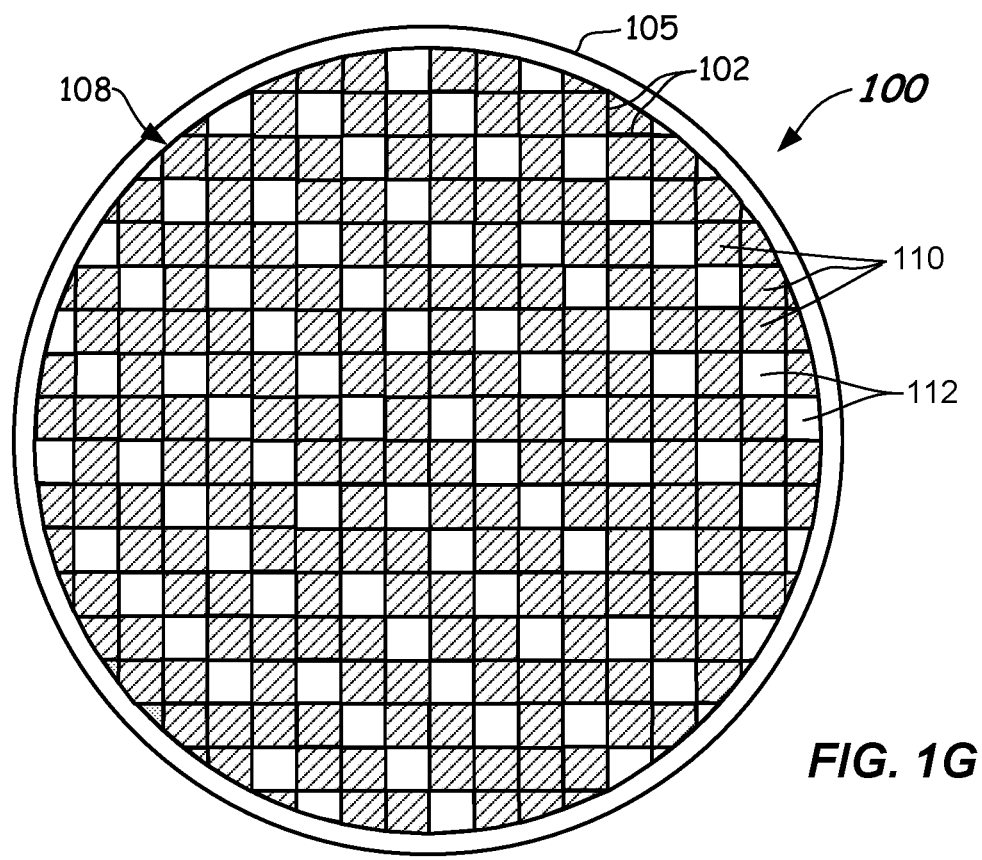
FIG. 1G illustrates an outlet-side, end view of a honeycomb body according to one or more embodiments.

The outermost cross-sectional shape of the honeycomb body 100 may be of any desired shape, such as a circle (as shown in FIG. 1F-1G), ellipse, oval, triangular or tri-lobed, racetrack, square, or rectangular, but the honeycomb body 100 is not limited to these cross-sectional shapes. Other cross-sectional shapes may be used.

In more detail, each of the repeating structural units 104 (one shown outlined with a dotted line in FIG. 1A) comprises a plurality of cell channels 108, including a plurality of inlet channels 110 (unshaded blocks—a few labeled) and a plurality of outlet channels 112 (shaded blocks—a few labeled) that extend parallel to each other in an axial direction (co-parallel to axial axis 114 shown in FIG. 1A) from an inlet face 116 to an outlet face 118. In the depicted embodiment, each repeating structural unit 104 (FIG. 1A, 1B) comprises an I/O ratio that is a ratio of a number of inlet channels 110 to a number of the outlet channels 112 in the repeating structural unit 104. The I/O ratio is 2.0<I/O<3.0 in one or more embodiments described herein. In the depicted embodiment of FIG. 1B, the repeating structural unit 104 includes an arrangement inlet channels 110 and outlet channels 112, and, in particular, nine inlet channels 110 and four outlet channels 112 and an I/O ratio of 2.25:1. The repeating structural unit 104 is made up of a configuration of two adjacent rows with six channels on a first row and seven channels on a second row, and each of the repeating structural units 104 comprises thirteen channels.

Each of the inlet channels 110 and the outlet channels 112 in the repeating structural unit 104 have a same cross-sectional size and cross-sectional shape in a transverse plane that is orthogonal to the axial axis 114. In the depicted embodiment of FIG. 1A-1F, the cross-sectional shape of each of the inlet channels 110 and outlet channels 112 is square. Furthermore, in this embodiment, each inlet channel 110 of a particular repeating structural unit 104 directly abuts an outlet channel 112 of the particular repeating structural unit 104. Thus, for each inlet channel 110, there is at least one shared filtering wall that is shared between each inlet channel 110 and an outlet channel 112 of the particular repeating structural unit 104. In FIGS. 1B, 1C, 2B, 3B, 4B, 5B, and 6A-6E, inlet channels 110 that include a dot marking have at least two walls in the matrix that abut outlet channels 112 in either the particular repeating structural unit or an adjacent repeating structural unit. Inlet channel 110 without a dot marking have one wall in the matrix that abuts outlet channels 112 in either the particular repeating structural unit or an adjacent repeating structural unit. As is shown in the described embodiment of FIG. 1B, the inlet channels 110 that include a dot marking have two walls in the matrix that abut outlet channels 112 in either the particular repeating structural unit 104 or an adjacent repeating structural unit 104' (one adjacent repeating structural unit 104' is shown in FIG. 1A). Thus, in the depicted embodiment, seven inlet channels 110 share two walls with outlet channels 112 and only two inlet channels 110 (without the dot) share one wall with an outlet channel 112.

The repeating pattern of repeating structural units 104, 104' in the honeycomb body 100 comprises each repeating structural unit 104 being positionally offset one channel width from an adjacent one of the repeating structural units 104'. The matrix of repeating structural units 104, 104' make up the honeycomb body 100. Of course, some of the channels located at the periphery of the honeycomb body 100 adjacent to the skin 105 will be part of incomplete repeating structural units, whose structure is terminated by and at the skin 105. As is apparent from FIG. 1F, the repeating pattern of repeating structural units 104, 104' comprises a group 115 of four diagonally-aligned outlet channels bounded on either end by inlet channels 110. The group 115 of diagonally-aligned outlet channels are aligned along a diagonal line 116, when the porous walls 102 are arranged vertically and horizontally as shown in FIG. 1E. The groups 115 are arranged in a series of co-parallel groups of four diagonally-aligned outlet channels thus providing a diagonally repeating pattern when viewed from the inlet face 116. The repeating structural unit 104 includes the configuration as is shown in FIG. 1B, as well as its mirror image 100M shown in FIG. 1C.

Figure 2A:
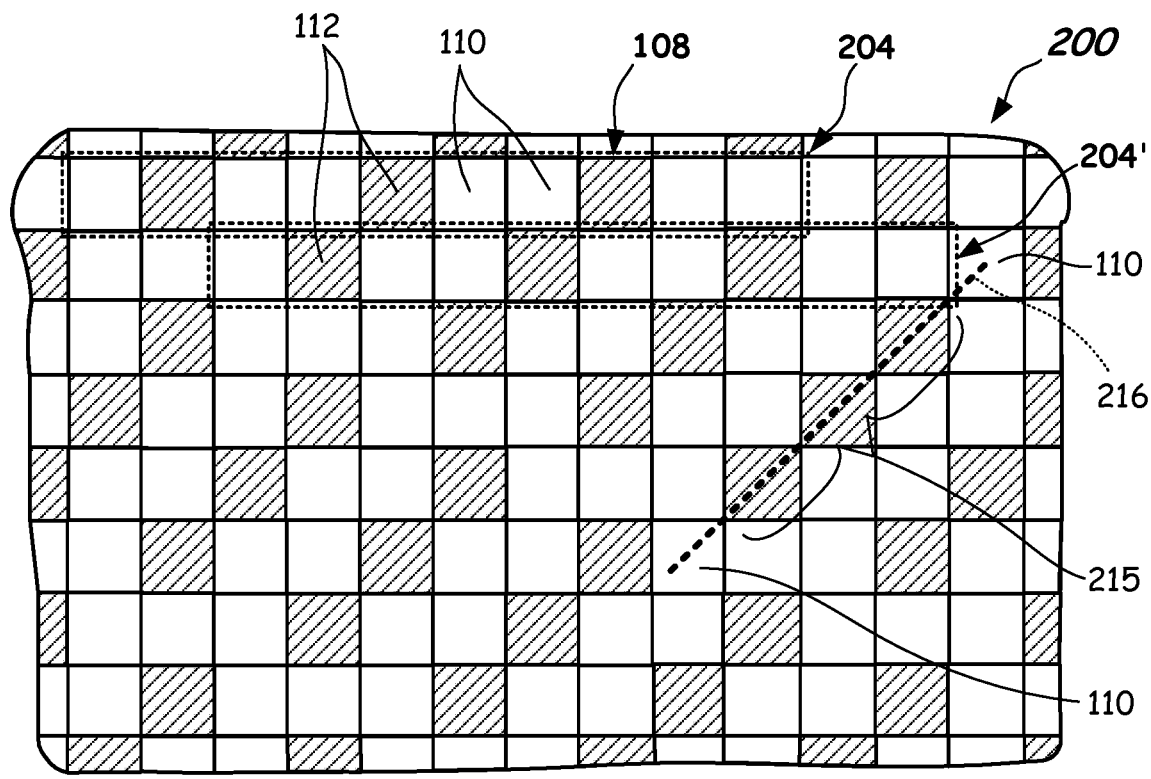
FIG. 2A illustrates a partial end face view of a honeycomb body including a plugging pattern according to one or more embodiments.
Figure 2B:
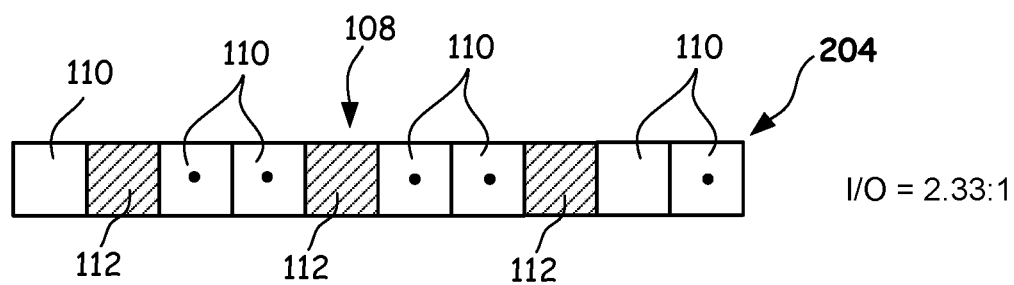
FIG. 2B illustrates an inlet-side view of a repeating structural unit of the honeycomb body of FIG. 2A including an I/O ratio of 2.33:1 according to one or more embodiments.

Referring now to FIGS. 2A and 2B, another embodiment of a honeycomb body 200 including a repeating structural unit 204 (outlined in a dotted line on the inlet face in FIG. 2A) is shown. The repeating structural unit 204 is repeated throughout the honeycomb body 200. Only a portion of the inlet face is shown, but the outlet face includes a corresponding plugging pattern where all the inlet channels 110 shown are plugged at the outlet face. Repeating structural unit 204, like in the previous embodiment, is a collection of inlet channels 110 and outlet channels 112 that are arranged in a specific pattern that is repeated over and over to form at least some of the structure of the honeycomb body 200.

As shown in this embodiment, each repeating structural unit 204, as viewed from the inlet face, is made up of seven inlet channels 110 and three outlet channels 112 (See FIG. 2B) for a total of ten channels, which are arranged in a straight line. The I/O ratio is 2.33:1. The repeating structural unit 204 has a rectangular outer perimeter shape and each of the cell channels 108 that are complete cell channels (e.g., not intersecting with the skin) may have a square shape in transverse cross-section. The repeating structural unit 204 includes the configuration as is shown in FIG. 2B, as well as its mirror image. In the depicted embodiment, the repeating pattern of repeating structural units 204 may be configured so that each of the repeating structural units 204 has an end that is offset two channel widths from a corresponding end of an adjacent one of the repeating structural units 204'. This offset configuration may provide a group of three diagonally-aligned outlet channels 215 bounded on either end by inlet channels 110 wherein the group of three diagonally-aligned outlet channels 215 is arranged along a diagonal line 216 aligned along the corners of offset cell channels. Further, the repeating pattern of repeating structural units 204 comprises a series of co-parallel groups 215 of three diagonally-aligned outlet channels wherein each group is bounded on either end by inlet channels. The co-parallel groups 215 may also be arranged along a diagonal.

Figure 3A:
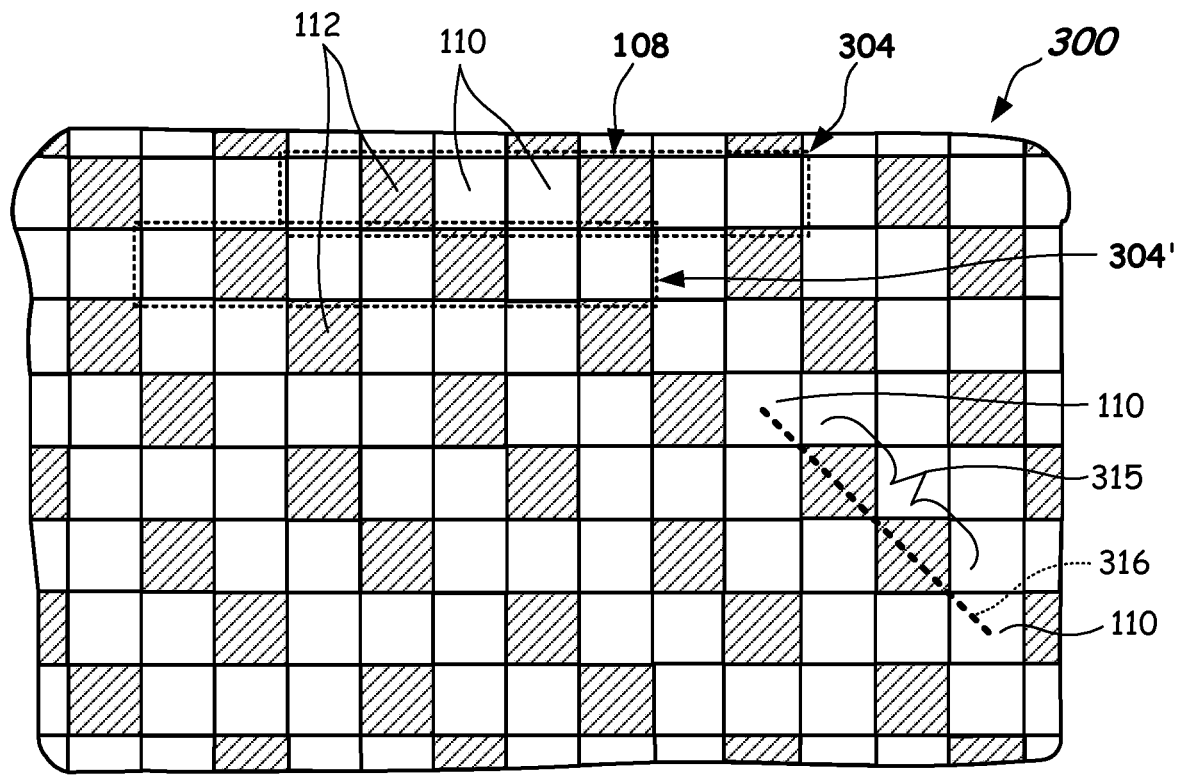
FIG. 3A illustrates a partial end face view of a honeycomb body including a plugging pattern according to one or more embodiments.
Figure 3B:
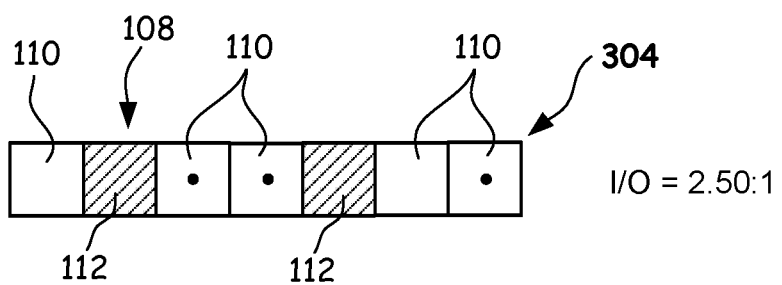
FIG. 3B illustrates an inlet-side view of a repeating structural unit of the honeycomb body of FIG. 3A including an I/O ratio of 2.50:1 according to one or more embodiments.

FIGS. 3A-3B illustrate another embodiment of honeycomb body 300 that includes a repeating structural unit 304 that is repeated throughout at least a portion of the honeycomb body 300. Only a portion of the inlet face is shown, but the outlet face includes a corresponding plugging pattern wherein all the inlet channels 110 shown on the inlet face are plugged at or near the outlet face. Repeating structural unit 304 is a collection of inlet channels 110 and outlet channels 112 arranged in a specific pattern that is repeated over and over to form at least some of the structure of the honeycomb body 300.

In this embodiment, each repeating structural unit 304, as viewed from the inlet face, is made up of five inlet channels 110 and two outlet channels 112 (See FIG. 3B) for a total of seven channels 108, which are arranged in a straight line. The I/O ratio is 2.50:1. The repeating structural unit 304 has a rectangular outer perimeter shape and each of the channels 108 that is a complete cell channel (e.g., not intersecting with the skin) may have a square shape in transverse cross-section. The repeating structural unit 304 includes the configuration as is shown in FIG. 3B, as well as its mirror image. In the depicted embodiment, the repeating pattern of repeating structural units 304 may be configured so that each of the repeating structural units 304 has an end that is offset two channel widths from a corresponding end of an adjacent one of the repeating structural units 304'. This offset configuration may provide a group of two diagonally-aligned outlet channels 315 bounded on either end by inlet channels 110 wherein the group of two diagonally-aligned outlet channels 315 is arranged along a diagonal line 316 that is aligned along the corners of offset channels 108. Furthermore, the repeating pattern of repeating structural units 304 comprises a series of co-parallel groups 315 of two diagonally-aligned outlet channels wherein each group is bounded on either end by inlet channels. The co-parallel groups 315 may also be arranged along a diagonal.

Figure 4A:
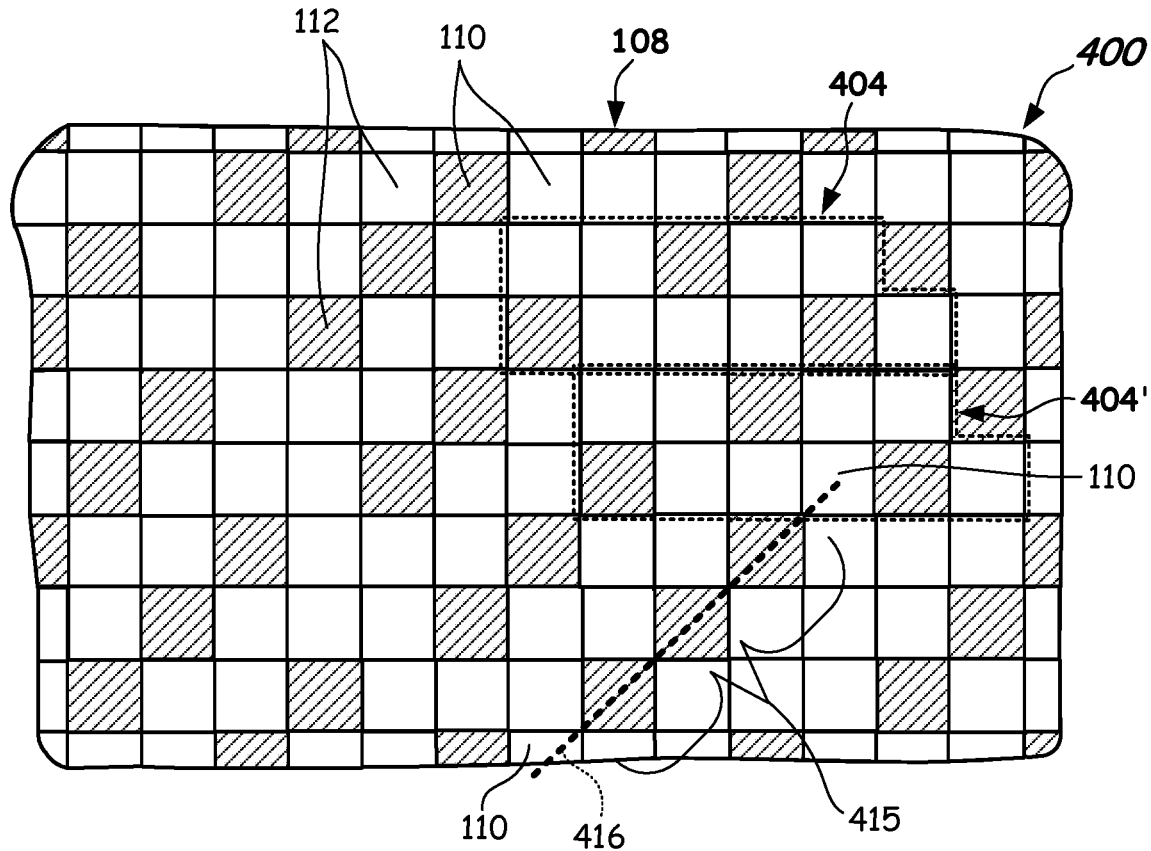
FIG. 4A illustrates a partial end face view of a honeycomb body including a plugging pattern according to one or more embodiments.
Figure 4B:
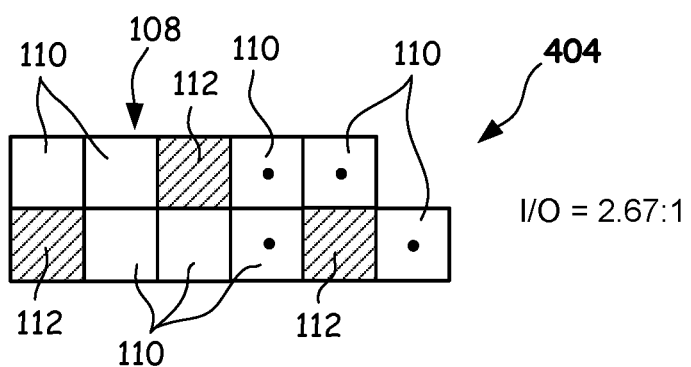
FIG. 4B illustrates an inlet-side view of a repeating structural unit of the honeycomb body of FIG. 3A including an I/O ratio of 2.67:1 according to one or more embodiments.

FIGS. 4A-4B illustrate another embodiment of honeycomb body 400 that includes a repeating structural unit 404 that is repeated throughout at least a portion of the honeycomb body 400. Only a portion of the inlet face is shown, but the outlet face includes a corresponding plugging pattern wherein all the inlet channels 110 shown are plugged at the outlet face. Repeating structural unit 404 is a collection of inlet channels 110 and outlet channels 112 arranged in a specific pattern that is repeated over and over to form at least some of the structure of the honeycomb body 400.

In this embodiment, each repeating structural unit 404, as viewed from the inlet face, is made up of eight inlet channels 110 and three outlet channels 112 (See FIG. 4B) for a total of eleven channels 108, which are arranged in two lines, one line of five channels 108 and one adjacent line of six channels 108. The I/O ratio is 2.67:1. The repeating structural unit 404 has a six-sided irregular polygonal outer perimeter shape and each of the channels 108 that are complete cell channels (e.g., not intersecting with the skin) may have a square shape in transverse cross-section. The repeating structural unit 404 includes the configuration as is shown in FIG. 4B, as well as its mirror image.

In the depicted embodiment, the repeating pattern of repeating structural units 404 may be configured so that each of the repeating structural units 404 has an end that is offset one channel width from a corresponding end of an adjacent one of the repeating structural units 404'. This offset configuration may provide a group of three diagonally-aligned outlet channels 415 bounded on either end by inlet channels 110, wherein the group of three diagonally-aligned outlet channels 415 is arranged along a diagonal line 416 that is aligned along the corners of offset channels 108. Furthermore, the repeating pattern of repeating structural units 404 comprises a series of co-parallel groups 415 of three diagonally-aligned outlet channels wherein each group 415 is bounded on either end by inlet channels 110. The co-parallel groups 415 may also be arranged along a diagonal.

Figure 5A:
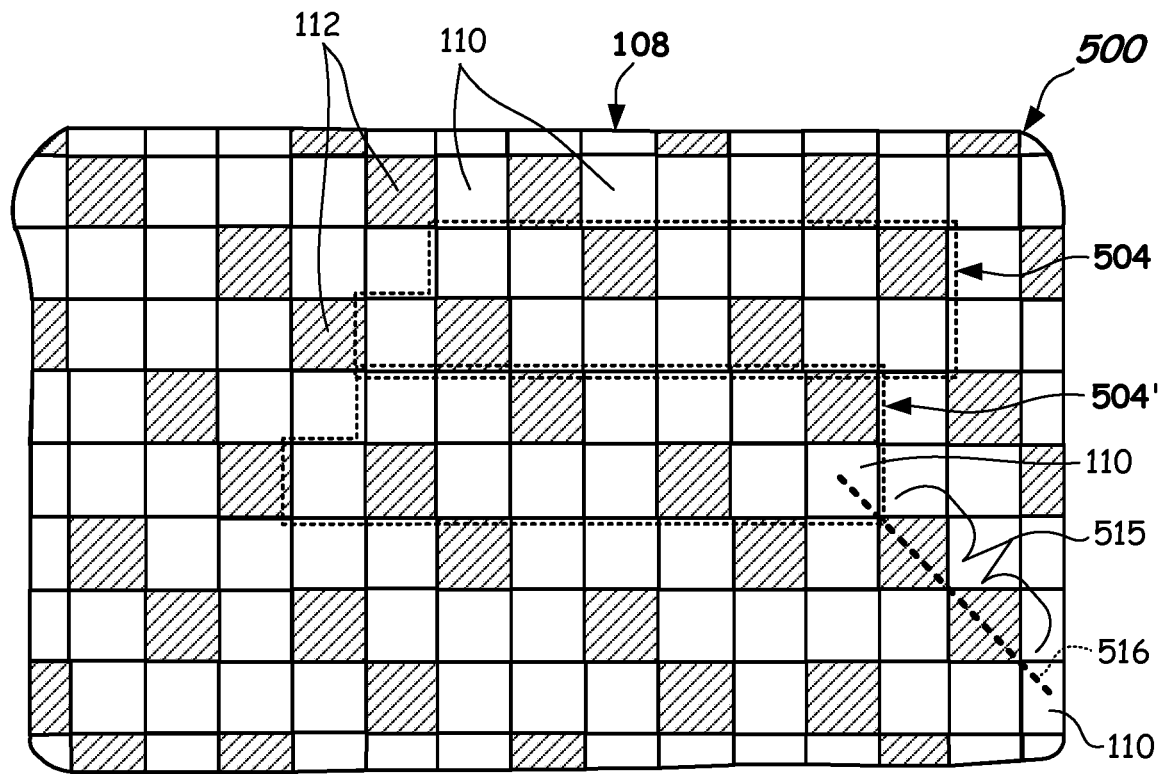
FIG. 5A illustrates a partial end face view of a honeycomb body including a plugging pattern according to one or more embodiments.
Figure 5B:
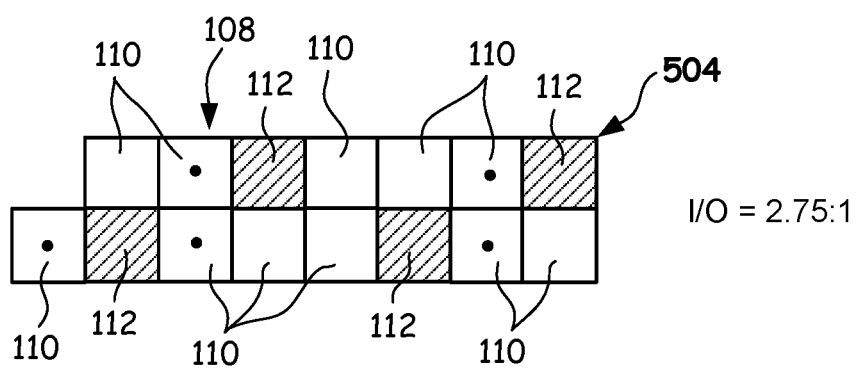
FIG. 5B illustrates an inlet-side view of a repeating structural unit of the honeycomb body of FIG. 3A including an I/O ratio of 2.75:1 according to one or more embodiments.
Figure 6A:
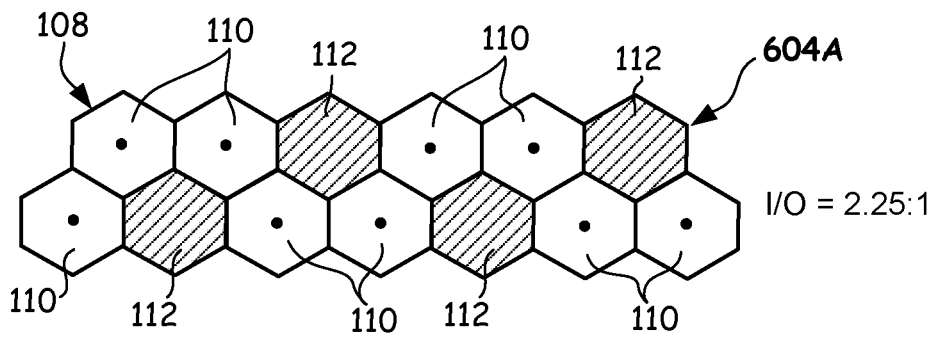
FIGS. 6A-6E illustrate inlet-side views of repeating structural units of honeycomb bodies including a hexagonal channel structure and I/O ratios of between 2.25:1 and 2.75:1 according to embodiments.
Figure 6B:
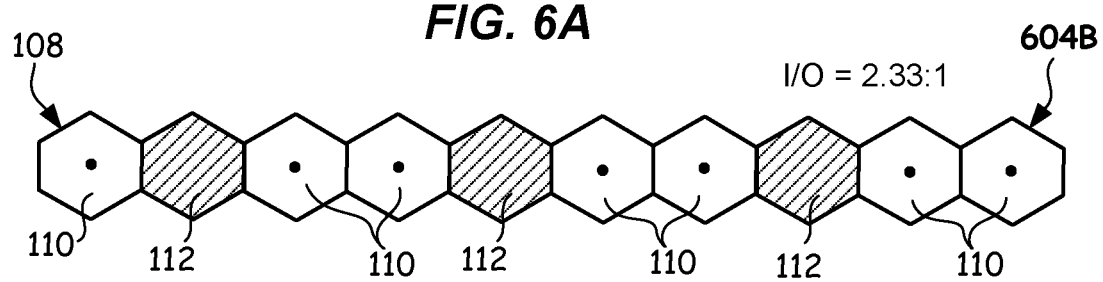
Figure 6C:
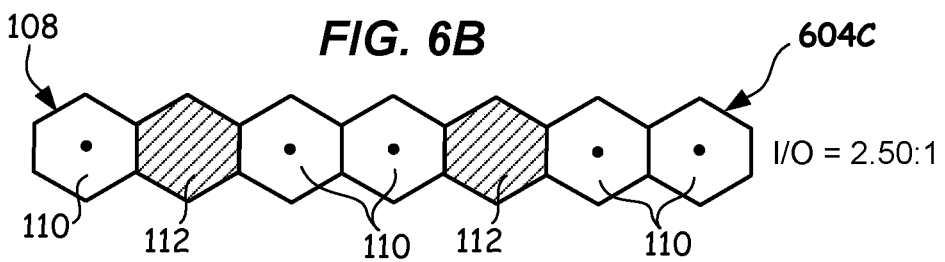
Figure 6D:
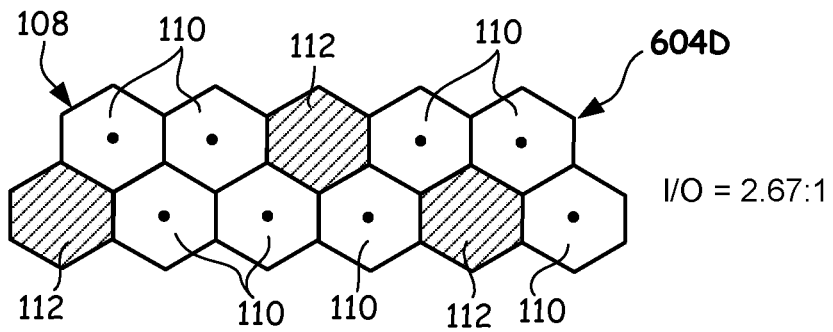
Figure 6E:
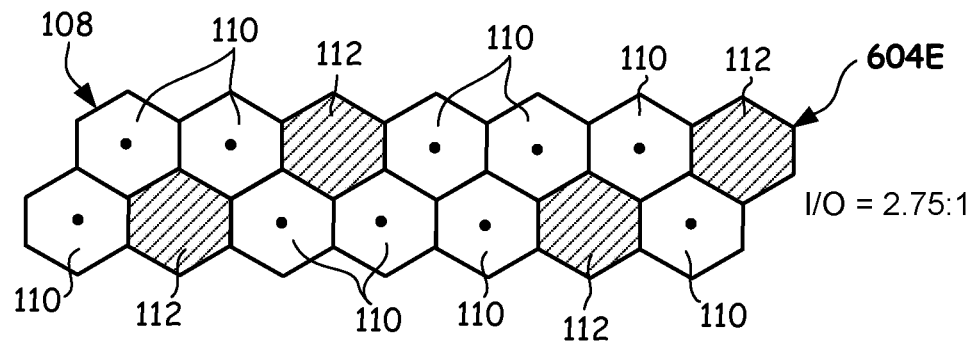

FIGS. 5A-5B illustrate yet another embodiment of honeycomb body 500 that includes a repeating structural unit 504 that is repeated throughout at least a portion of the honeycomb body 500. Only a portion of the inlet face is shown, but the outlet face includes a corresponding plugging pattern, wherein all the inlet channels 110 shown are plugged at the outlet face. Repeating structural unit 504 is a collection of channels 108 comprising inlet channels 110 and outlet channels 112 arranged in a specific pattern that is repeated over and over to form at least some of the structure of the honeycomb body 500.

In this embodiment, each repeating structural unit 504, as viewed from the inlet face, is made up of eleven inlet channels 110 and four outlet channels 112 (See FIG. 5B) for a total of fifteen channels 108, which are arranged in two lines, one line of seven channels 108 and one adjacent line of eight channels 108. The I/O ratio is 2.75:1. The repeating structural unit 504 has a six-sided, irregular polygonal outer perimeter shape and each of the channels 108 that are complete channels (e.g., not truncated due to intersecting with the skin) may have a square shape in transverse cross-section. The repeating structural unit 504 includes the configuration as is shown in FIG. 5B, as well as its mirror image.

In the depicted embodiment, the repeating pattern of repeating structural units 504 may be configured so that each of the repeating structural units 504 has an end that is offset one channel width from a corresponding end of an adjacent one of the repeating structural units 504'. This offset configuration may provide a group of two diagonally-aligned outlet channels 515 bounded on either end by inlet channels 110, wherein the group of two diagonally-aligned outlet channels 515 is arranged along a diagonal line 516 that is aligned along the corners of offset channels 108. Furthermore, the repeating pattern of repeating structural units 504 comprises a series of co-parallel groups 515 of two diagonally-aligned outlet channels wherein each group 515 is bounded on either end by inlet channels 110.

FIGS. 6A-6E illustrate alternate embodiments of repeating structural units 604A-604E that can be repeated throughout at least a portion of a honeycomb body. In each of the embodiments shown, the configuration of the repeating structural units 604A-604E are the same as has been described above, except that the shape of each of the channels 108 in transverse cross-section is hexagonal. Each of the inlet channels 110 and outlet channels 112 in each of the repeating structural units 604A-604E is hexagonal in cross-section in a transverse plane. Other channel shapes in cross-section may be used, such as rectangular or circular.

In some embodiments, each repeating structural unit 104-604E may be provided in a direct abutting relationship with other adjacent repeating structural units 104-604E that are substantially identical to the repeating structural unit 104-604E. For example, in some regions across the honeycomb body, the repeating structural unit 104-604E may be entirely surrounded and abutted by other adjacent repeating structural units 104-604E that are substantially identical to the particular repeating structural unit 104-604E. For example, in FIGS. 1A-5A, each side of the repeating structural unit 104-504 may be directly abutted by an adjacent repeating structural unit 104-604E. Moreover, in some embodiments, each lateral end of the repeating structural unit 104-604E may be abutted by other identical repeating structural units 104-504A. Some of the repeating structural units 104-604E near the skin 105 may be adjacent to one or more incomplete repeating structural units (including less than all the structure of a repeating structural unit 104-604E). In some embodiments, repeating structural units 104-604E may be arranged in an abutting relationship with mirror images of themselves. In other embodiments, repeating structural units 104-604E may be offset (e.g., laterally) from one another one or more cell widths (or one or more half widths in the case of hexagonal cells). Such offsets can produce structural units 104-604E with combinations of shared single walls (no dots) and double shared walls (with a dot). Certain offsets for particular ones of the structural units 104-604E can provide two shared walls for all of the inlet cells of the particular structural unit 104-604E, whereas other lateral offsets may only provide some with two shared walls. For example, in some embodiments, a structural unit 104-604E above a particular structural unit 104-604E, may be offset laterally by one half a cell width (for hexagonal cells), a cell width, one and a half cell widths (for hexagonal cells), two cell widths, or another amount of cell widths. A structural unit 104-604E below a particular structural unit 104-604E, may be offset laterally in an opposite direction by a same amount of cells. In some embodiments having more than one row of cells, the structural units 104-604E may be offset vertically, in that a direct end to end abutting relationship may not be present. For example, some embodiments can be offset one half row vertically (e.g., structural units with two-row hexagonal cell structures) or one row vertically (e.g., structural units with two-row rectangular cell structures). In some embodiments, combinations of offsets and mirrored images may be used. As will be apparent, in some embodiments, other configurations of channels and other types of repeating structural units may be present in the honeycomb body along with the repeating structural units 104-604E. For example, in some embodiments, some pass through (unplugged) channels may be periodically dispersed within the honeycomb body. Furthermore, each of the channels 108 of the embodiments of repeating structural units 104-604E described herein may include a slight fillet or chamfer at one or more of the corners of the channels 108 thereof.

Other configurations of repeating structural units that include a collection of inlet channels 110 and outlet channels 112 that are arranged in a specific pattern that is repeated over and over to form at least some of the structure of the honeycomb body may be used, provided the repeating structural units has 2.0<I/O<3.0, and each of the inlet channels 110 and the outlet channels 112 have a same cross-sectional size and shape in a transverse plane orthogonal to the axial direction. Moreover, each inlet channel 110 of a particular repeating structural unit may directly abut an outlet channel 112 of the particular repeating structural unit. For example, a side of an inlet channel 110 may be part of a same wall as a side of an outlet channel 112 abutting therewith, i.e., they have a shared wall.

Referring to all embodiments, the repeating structural units 104-604E include the area of the described inlet channels 110 and outlet channels 112 therein and also include half of the transverse wall thickness Tw (FIG. 1D) of the porous walls 102 surrounding the outer perimeter of the included inlet channels 110 and outlet channels 112.

In some embodiments, a honeycomb assembly may be produced by adhering together multiple ones of honeycomb bodies (e.g., having a square or rectangular outer perimeter). Each of the honeycomb bodies may include multiple ones of any of the repeating structural units 104-604E, or functional equivalents, as described herein, repeated therein. Any suitable cement mixture may be used for adhering together the multiple honeycomb bodies. For example, a cement mixture such as is described in WO 2009/017642 may be used. Other suitable cement mixtures may be used. Any outer shape of the honeycomb assembly may be used, such as square, rectangular, circular, elliptical, oval, race track, and the like. A suitable skin may be applied around the outer periphery of the honeycomb assembly in some embodiments.

Embodiments of the honeycomb bodies 100-500 (and honeycomb bodies including the repeating structural units 104-604E) described herein may include certain microstructural and geometrical structural properties, which in combination with the configuration of the repeating structural units 104-604E may provide for a combination of good soot and ash loading capacity and relatively-low pressure drop performance, including relatively-low clean pressure drop as well as relatively-low pressure drop increase as a function of soot and/or ash loading.

For example, the open and interconnected porosity (% P) of the porous walls 102, after firing, may be % P≥40%, % P≥45%, % P≥50%, % P≥60%, or even % P≥65%. In some embodiments, the open and interconnected porosity of the intersecting porous walls 102 may be 35%≤% P≤70%, or even 40%≤% P≤60%, or even 45%≤% P≤55%. Other values of % P may be used. Porosity (% P) as recited herein is measured by a mercury porosity measurement method.

In some embodiments, the porous walls 102, after firing, may include a transverse wall thickness Tw of Tw≥0.004 inch (0.102 mm), Tw≥0.006 inch (0.150 mm), Tw≥0.008 inch (0.203 mm), or even Tw≥0.010 inch (0.254 mm). Also, in some embodiments, Tw≤0.014 inch (0.356 mm), Tw≤0.012 inch (0.305 mm), or even Tw≤0.010 inch (0.254 mm). In one or more embodiments, 0.004 inch (0.102 mm)≤Tw≤0.014 inch (0.356 mm), or even 0.006 inch (0.150 mm)≤Tw≤0.010 inch (0.254 mm). Other values of transverse wall thickness Tw may be used. Each of the walls 102 may include a common transverse wall thickness Tw.

In some embodiments, the porous walls 102, after firing, may include a median pore diameter (MPD) of 10 μm≤MPD≤16 μm, or even 11 μm≤MPD≤15 μm. The breadth Db of the pore size distribution of the open, interconnected porosity may be Db≤1.5, or even Db≤1.0, wherein Db=$((D_{90}-D_{10})/D_{50})$, wherein $D_{90}$ is an equivalent spherical diameter in the pore size distribution of the porous walls 102 where 90% of the pores have an equal or smaller diameter and 10% have a larger diameter, and $D_{10}$ is an equivalent spherical diameter in the pore size distribution where 10% of the pores have an equal or smaller diameter, and 90% have a larger diameter. The median pore diameter (MPD) and breadth Db of the pore size distribution may be measured by mercury porosimetry.

The cell density (CD) of the honeycomb bodies (e.g., 100-500) may be may be 10 cells/in² (1.55 cells/cm²) ≤CD≤400 cells/in² (62 cells/cm²), or even 50 cells/in² (7.75 cells/cm²)≤CD≤375 cells/in² (58 cells/cm²), or even 225 cells/in² (35 cells/cm²)≤CD≤375 cells/in² (58 cells/cm²), and may be CD≥150 cells/in² (23 cells/cm²), or even CD≥200 cells/in² (31 cells/cm²) in some embodiments. Other cell densities may be used. The above described % P, Tw, Db, MPD, and CD may be combined in any combination with each other and with the repeating structural units 104-604E described herein.

One particularly effective example, including the configuration of any of the repeating structural units 104-604E, comprises a honeycomb body having a wall thickness Tw of the porous walls 102 of 0.006 inch (0.152 mm)≤Tw≤0.010 inch (0.254 mm), an open porosity (% P) of the intersecting porous walls 102 of 40%≤P %≤60%, a median pore size (MPS) of the porous walls 102 of 10 microns≤MPS≤16 microns, and an I/O ratio of 2.25≤I/O≤2.75.

Figure 7:
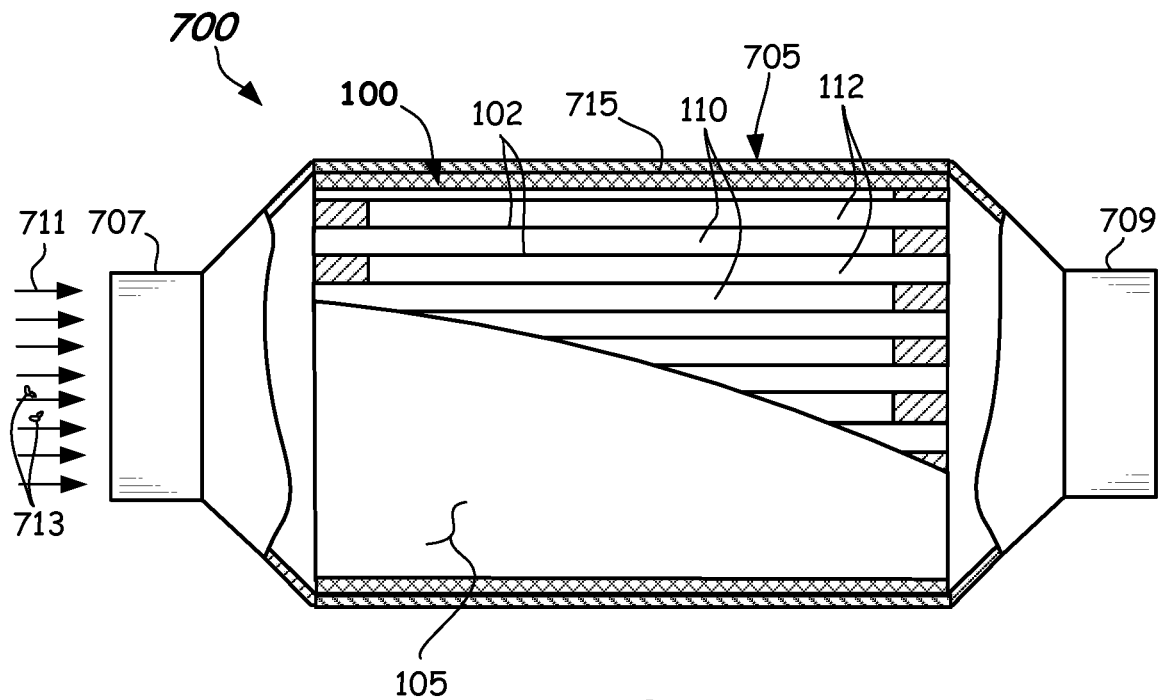
FIG. 7 illustrates a partially cross-sectioned side view of a particulate filter of containing a honeycomb body according to one or more embodiments.

Referring now to FIG. 7, a particulate filter 700 including the honeycomb body 100 (or optionally, honeycomb bodies 200-500 or honeycomb bodies including any one of repeating structural units 604A-604E) is shown. In the depicted embodiment, the honeycomb body 100 is received inside of a can 705, such as a metal housing or other confining structure. Can 705 may include a first end cap including an inlet 707 configured to receive engine exhaust 711 containing soot and/or inorganic particulates, and a second end cap including an outlet 709 configured to exhaust a filtered gas flow, wherein a large percentage (e.g., approximately 99% or greater) of the particulates 713 (e.g., soot and/or inorganic matter) in the engine exhaust have been removed/filtered and are carried in the inlet channels 110 and open interconnected porosity of the porous walls 102 of the honeycomb body 100. The skin 105 of the honeycomb body 100 may have a member 715 in contact therewith, such as a high-temperature insulation material, to cushion the honeycomb body 100 from shock and stress. Any suitable construction of the member 715 may be used, such as one-piece construction, or two or more layer construction. The honeycomb body 100 and member 715 may be received in the can 705 by any suitable means, such as by funneling into the central body and then one or more of the first and second end caps may be secured (e.g., welded) onto the central body to form the inlet 707 and the outlet 709. Other, two-piece construction or clam-shell construction of the can 705 may optionally be used.

Figure 8:
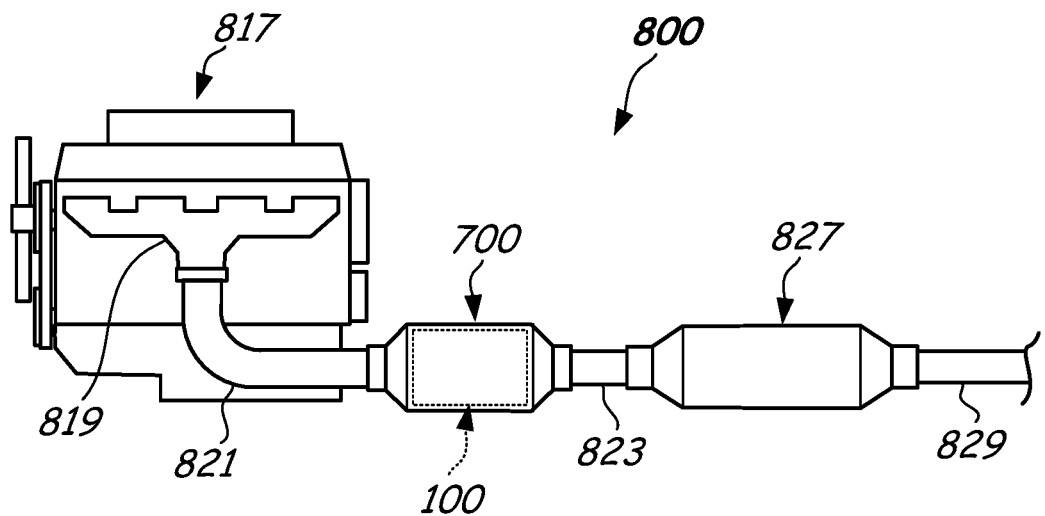
FIG. 8 illustrates a schematic side view of an exhaust system of an internal combustion engine including a particulate filter containing a honeycomb body according to one or more embodiments.

FIG. 8 illustrates an exhaust system 800 coupled to an engine 817 (e.g., a gasoline engine or diesel engine). The exhaust system 800 may include a manifold 819 for coupling to the exhaust ports of the engine 817, a first collection tube 821 configured to couple between the manifold 819 and the particulate filter 700 containing the honeycomb body 100 therein. Coupling may be by any suitable clamping bracket or other attachment mechanism such as welding. The first collection tube 821 may be integral with the manifold 819. In further embodiments, the particulate filter 700 may couple directly to the manifold 819 without an intervening member. The exhaust system 800 may further include a second collection tube 823 coupled to the particulate filter 700 and to a second exhaust component 827. The second exhaust component 827 may be a muffler, a catalytic converter, or even a second particulate filter, for example. A tailpipe 829 (shown truncated) or other conduit or component may be coupled to the second exhaust component 827. Other exhaust system components may be included, such as oxygen sensors, ports for urea injection, and the like (not shown). The engine 817 may include one particulate filter 700 for each bank (side set of cylinders) of the engine 817 in which case the second collection tube 823 may be a Y-tube, or optionally, the first collection tube 821 may be a Y-tube collecting soot from each bank and directing the soot to the particulate filter 700.

Utilizing the particulate filter 700 including the honeycomb body 100 (or optionally, honeycomb bodies 200-500 or honeycomb bodies including any one of repeating structural units 604A-604E) according to embodiments described herein may result in relatively-longer intervals between regeneration events due to the relatively large ash and soot loading capability of the particulate filter 700. Furthermore, relatively-longer service intervals in order to replace the filter 700 may occur. Moreover, relatively-low back pressure exerted by the honeycomb body 100 in the exhaust system 800 when loaded with ash may allow for free exhaust flow and thus substantially minimal power reduction of the engine 817. The exhaust system 800 including the honeycomb body (e.g., honeycomb bodies 100-500 or honeycomb bodies including any of repeating structural units 604A-604E) may include very low clean pressure drop, low soot-loaded pressure drop, and/or low ash-loaded pressure drop, as well as low rate of increase in pressure drop as a function of soot and/or ash loading.

Figure 9A:
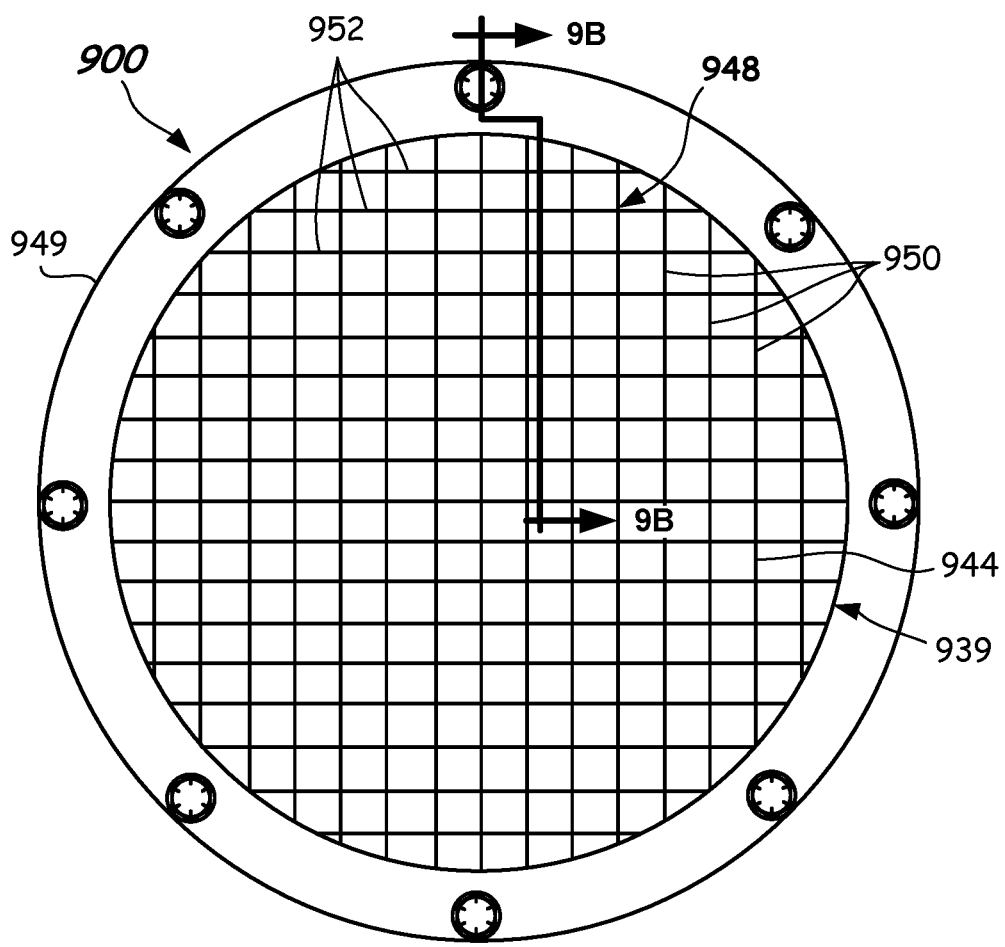
FIG. 9A illustrates a front view of an extrusion die used for manufacture a honeycomb article, which is thereafter plugged to form the honeycomb body according to one or more embodiments.
Figure 9B:
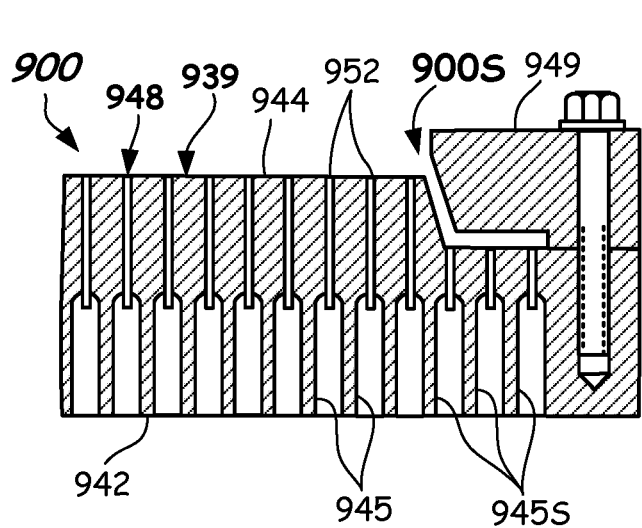
FIG. 9B illustrates a partial cross-sectioned side view of the extrusion die taken along section line 9B-9B of FIG. 9A according to one or more embodiments.
Figure 9C:
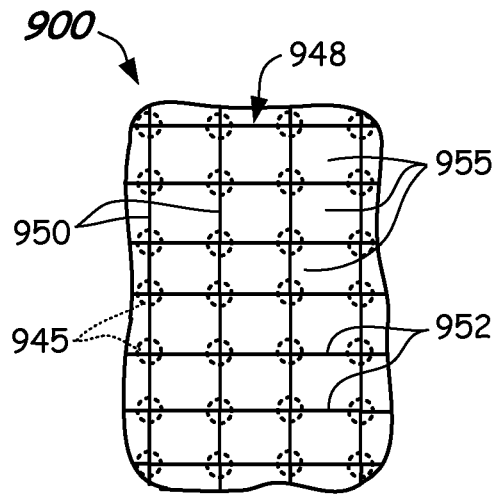
FIG. 9C illustrates a partial front view of the extrusion die of FIG. 9A illustrating feedhole locations according to one or more embodiments.

Referring now to FIGS. 9A-9C, a honeycomb extrusion die 900 configured to manufacture the honeycomb bodies 100-500 and honeycomb bodies including honeycomb structures 600A-604E according to embodiments of the disclosure is provided. The honeycomb bodies may be formed by extrusion of a plasticized batch, which is described, for example, in U.S. Pat. Nos. 3,885,977, 5,332,703, 6,391,813, 7,017,278, 8,974,724, WO2014/046912, and WO2008/066765, through the honeycomb extrusion die 900 to produce a green honeycomb body. The green honeycomb body may then be dried, such as described in U.S. Pat. Nos. 9,038,284, 9,335,093, 7,596,885, and 6,259,078. The green honeycomb body may then be fired, such as described in U.S. Pat. Nos. 9,452,578, 9,446,560, 9,005,517, 8,974,724, 6,541,407, and 6,221,308, to form any desired one of the honeycomb bodies 100-500 or honeycomb bodies including honeycomb structures 600A-604E including the geometry and microstructure described herein. Other suitable forming, drying and/or firing methods may be used.

The honeycomb extrusion die 900 includes a die body 939, a die inlet face 942 configured to receive the plasticized batch composition, and a die outlet face 944 opposite from the die inlet face 942 and configured to expel plasticized batch in the form of a green honeycomb body. The extrusion die 900 may be coupled to an extruder (such as a twin-screw extruder—not shown) that receives the batch composition and forces the batch composition under pressure through the extrusion die 900.

The honeycomb extrusion die 900 includes a plurality of feedholes 945 (a few labeled) extending from the die inlet face 942 into the die body 939, and intersecting with an array of slots 948 (a few labeled) extending into the die body 939 from the die outlet face 944 and connecting with the plurality of feedholes 945. The feedholes 945 supply batch composition to the array of slots 948. The intersecting array of slots 948 includes first slots 950 (a few labeled) extending in a straight line entirely across the die outlet face 944 (e.g., vertically as shown), and second slots 952, which may be orthogonal to the first slots 950 and may also extend in a straight line fully across the die outlet face 944 (e.g., horizontally as shown). The intersecting array of slots 948 form an array of die pins 955 that are repeated across at least some of the die outlet face 944, and may encompass the substantial entirety of the die outlet face 944 in some embodiments. The array of die pins 955 may be arranged, as shown, in a side-by-side abutting relationship in the horizontal direction, and stacked one atop another in the vertical direction, for example. The slots 950, 952 may be formed by abrasive wheel slotting or by wire electron discharge machining (EDM) process in the depicted embodiment, for example. Other suitable methods may be used. Each of the array of die pins 955 may be square in transverse cross-sectional shape. The honeycomb extrusion die 900 may include a skin-forming portion 900S including a skin-forming mask 949 (e.g., a ring-shaped article) that interfaces with skin forming feedholes 945S to form an extruded skin on the extruded green honeycomb body formed during the extrusion method.

FIG. 9C illustrates an embodiment of honeycomb extrusion die 900, which includes a feedhole patterns (feedholes 945 shown as dotted circles and slots 950, 952 shown as solid lines). In the depicted embodiment wherein feedholes 945 are included at every intersection of the slots 950, 952. Other feedhole configurations may be used in embodiments of the honeycomb extrusion die 900.

In another embodiment shown in partial view in FIG. 10, the die 1000 includes a die body 1039 including an array of slots 1048 forming an array of die pins 1055 including a hexagonal cross-sectional shape to be able to form honeycomb bodies having the repeating structural units 604A-604E of FIGS. 6A-6E. The die body 1039 may include a feedhole pattern wherein the feedholes 1045 (shown as dotted circles) are included at every intersection of the array of slots 1048. The array of slots 1048 may be formed by an electron discharge machining (EDM) process, wherein a formed electrode is plunged into the die body 1039 to machine the array of slots 1048. The remainder of the extrusion die 1000 may be the same as described above.

In any of the above embodiments, once the green honeycomb is formed, dried and fired, it may be cut to the desired length. The end faces of the fired honeycomb may be ground flat and to have a suitable surface finish for the plugging process being used. The inlet and outlet faces are then plugged in the desired repeating plugging pattern as discussed herein, so that the repeating structural unit (e.g., repeating structural unit 104, 204, 304, 404, 504, or 604A-604E or mirror images thereof) may be produced. The desired repeating structural unit from the above-listed repeating structural units may be formed by plugging the appropriate inlet channels 110 and outlet channels 112 such that the repeating structural unit is distributed and repeated across at least some of the inlet face. In some embodiments, the repeating structural unit (e.g., repeating structural unit 104, 204, 304, 404, 504, or 604A-604E or mirror images thereof) is distributed and repeated across the entire honeycomb body, excluding only incomplete repeating structural units that intersect with the skin 105 and are truncated. In other embodiments, less than all of the available area includes repeating structural units.

FIG. 11 describes a method 1100 of filtering particulates according to one or more embodiments. The method 1100 includes, in 1102, providing a honeycomb body (e.g., honeycomb body 100, 200, 300, 400, 500, or a honeycomb body including one of the repeating structural units 604A-604E) having inlet channels (e.g., inlet channels 110) and outlet channels (e.g., outlet channels 112) as described herein and embodied in a particulate filter (e.g., particulate filter 700) wherein the repeating structural units have an I/O ratio 2.0<I/O<3.0, wherein I/O is a ratio of a number of the inlet channels to a number of the outlet channels in each of the repeating structural units, and wherein each of the inlet channels and the outlet channels have a same cross-sectional size (area) and cross-sectional shape (in a transverse plane orthogonal to the axial direction). The cross-sectional shape may be square, hexagonal, circular, or the like, and wherein each inlet channel 110 of a particular repeating structural unit is configured and arranged to directly abut (i.e., share a wall) with either: (1) an outlet channel 112 of the particular repeating structural unit, or (2) an outlet channel 112 of an adjacent repeating structural unit (e.g., 104', 204', 304', 404', 504').

The method 1100 further includes, in 1104, capturing soot and ash in the honeycomb body (e.g., honeycomb body 100, 200, 300, 400, 500, or a honeycomb body including one of the repeating structural units 604A-604E). The soot and ash is captured in and on the webs 102 of the inlet channels 110. Soot can be captured and may be burned out through one or more regeneration events, or the like, and the particulate filter 700 including the honeycomb body (e.g., honeycomb body 100, 200, 300, 400, 500, or a honeycomb body including one of the repeating structural units 604A-604E) including the pattern of the repeating structural unit can remain in service for an extended period of time, and have much higher ash storage capacity. In some embodiments the ash storage capacity may be higher than 20 g/L. In other embodiments, the ash storage capacity may be higher than 40 g/L, higher than 60 g/L, or may be even higher than 80 g/L, for example. Moreover, the particulate filter 700 including the honeycomb body (e.g., honeycomb body 100, 200, 300, 400, 500, or a honeycomb body including one of the repeating structural units 604A-604E) can exhibit relatively low soot-loaded and ash-loaded pressure drop.

The foregoing description discloses example embodiments of the disclosure. Any combination of the parameters disclosed herein may be applied to honeycomb body embodiments disclosed herein. Accordingly, while the present disclosure includes certain example embodiments, it should be understood that other embodiments may fall within the scope of the disclosure, as defined by the claims.

What is claimed is:

1. A honeycomb body comprising:
intersecting porous walls forming a matrix of repeating structural units arranged in a repeating pattern, wherein each of the repeating structural units comprises:
a plurality of inlet channels and a plurality of outlet channels that extend parallel to each other in an axial direction from an inlet face to an outlet face;
wherein an I/O ratio of a number of the inlet channels to a number of the outlet channels in each of the repeating structural units is between 2.0 and 3.0;
each of the inlet channels and the outlet channels have a same cross-sectional size and cross-sectional shape in a transverse plane orthogonal to the axial direction; and
each of the inlet channels directly abuts at least one of the outlet channels;
wherein each of the inlet channels and the outlet channels in each of the repeating structural units is square in cross-section in the transverse plane, and
wherein the repeating pattern of repeating structural units comprises a series of co-parallel groups of four diagonally-aligned outlet channels wherein each group is bounded on either end by inlet channels.

2. The honeycomb body of claim 1, wherein each inlet channel of a particular repeating structural unit directly abuts an outlet channel within its respective particular repeating structural unit.

3. A honeycomb body comprising:
intersecting porous walls forming a matrix of repeating structural units arranged in a repeating pattern, wherein each of the repeating structural units comprises:
a plurality of inlet channels and a plurality of outlet channels that extend parallel to each other in an axial direction from an inlet face to an outlet face;
wherein an I/O ratio of a number of the inlet channels to a number of the outlet channels in each of the repeating structural units is between 2.0 and 3.0;
each of the inlet channels and the outlet channels have a same cross-sectional size and cross-sectional shape in a transverse plane orthogonal to the axial direction; and
each of the inlet channels directly abuts at least one of the outlet channels;
wherein each of the inlet channels and the outlet channels in each of the repeating structural units is square in cross-section in the transverse plane, and
wherein the repeating pattern of repeating structural units comprises a series of co-parallel groups of three diagonally-aligned outlet channels wherein each group is bounded on either end by inlet channels.

4. A honeycomb body comprising: intersecting porous walls forming a matrix of repeating structural units arranged in a repeating pattern, wherein each of the repeating structural units comprises: a plurality of inlet channels and a plurality of outlet channels that extend parallel to each other in an axial direction from an inlet face to an outlet face; wherein an I/O ratio of a number of the inlet channels to a number of the outlet channels in each of the repeating structural units is between 2.0 and 3.0; each of the inlet channels and the outlet channels have a same cross-sectional size and cross-sectional shape in a transverse plane orthogonal to the axial direction; and each of the inlet channels directly abuts at least one of the outlet channels; wherein the repeating pattern of repeating structural units comprises a series of co-parallel groups of four diagonally-aligned outlet channels wherein each group is bounded on either end by inlet channels.

5. A honeycomb body comprising: intersecting porous walls forming a matrix of repeating structural units arranged in a repeating pattern, wherein each of the repeating structural units comprises: a plurality of inlet channels and a plurality of outlet channels that extend parallel to each other in an axial direction from an inlet face to an outlet face; wherein an I/O ratio of a number of the inlet channels to a number of the outlet channels in each of the repeating structural units is between 2.0 and 3.0; each of the inlet channels and the outlet channels have a same cross-sectional size and cross-sectional shape in a transverse plane orthogonal to the axial direction; and each of the inlet channels directly abuts at least one of the outlet channels; wherein each of the repeating structural units comprises seven inlet channels and three outlet channels and the I/O ratio is 2.33:1; and wherein the repeating pattern of repeating structural units comprises a series of co-parallel groups of three diagonally-aligned outlet channels wherein each group is bounded on either end by inlet channels.

6. A honeycomb body comprising: intersecting porous walls forming a matrix of repeating structural units arranged in a repeating pattern, wherein each of the repeating structural units comprises: a plurality of inlet channels and a plurality of outlet channels that extend parallel to each other in an axial direction from an inlet face to an outlet face; wherein an I/O ratio of a number of the inlet channels to a number of the outlet channels in each of the repeating structural units is between 2.0 and 3.0; each of the inlet channels and the outlet channels have a same cross-sectional size and cross-sectional shape in a transverse plane orthogonal to the axial direction; and each of the inlet channels directly abuts at least one of the outlet channels; wherein each of the repeating structural units comprises eight inlet channels and three outlet channels and the I/O ratio is 2.67:1; wherein the repeating pattern of repeating structural units comprises a series of co-parallel groups of three diagonally-aligned outlet channels wherein each group is bounded on either end by inlet channels.

* * * * *